United States Patent
Hong

(10) Patent No.: US 11,822,381 B2
(45) Date of Patent: *Nov. 21, 2023

(54) METHOD OF ADJUSTING LOCATION AND TILTING OF MONITOR

(71) Applicant: DOTHEAL Co., Ltd., Suwon-si (KR)

(72) Inventor: Bo Ram Hong, Hwaseong-si (KR)

(73) Assignee: DOTHEAL Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,811

(22) Filed: May 26, 2022

(65) Prior Publication Data

US 2022/0282826 A1  Sep. 8, 2022

Related U.S. Application Data

(63) Continuation of application No. PCT/KR2020/017089, filed on Nov. 27, 2020.

(30) Foreign Application Priority Data

| Nov. 27, 2019 | (KR) | 10-2019-0154929 |
| Nov. 27, 2019 | (KR) | 10-2019-0154931 |
| Aug. 14, 2020 | (KR) | 10-2020-0102679 |

(51) Int. Cl.
*G06T 7/00* (2017.01)
*G06F 1/16* (2006.01)
(Continued)

(52) U.S. Cl.
CPC ........ *G06F 1/1601* (2013.01); *F16M 11/041* (2013.01); *F16M 11/043* (2013.01);
(Continued)

(58) Field of Classification Search
CPC ........ G06F 1/1601; G06F 3/012; G06T 7/50; G06T 7/521; G06T 7/11; G06T 7/70;
(Continued)

(56) References Cited

U.S. PATENT DOCUMENTS

| 6,012,693 A | 1/2000 | Voeller et al. |
| 6,478,275 B1 | 11/2002 | Huang |

(Continued)

FOREIGN PATENT DOCUMENTS

| CN | 202484545 U | 10/2012 |
| CN | 203178860 U | 9/2013 |

(Continued)

OTHER PUBLICATIONS

Monoprice, "Workstream by Monoprice Adjustable Gas Spring Desk Mount for 15-34in Monitors, Silver." Apr. 2016, Amazing Products, whole document. https://www.monoprice.com/product?p_id=33535 Corresponding video (2018) https://www.youtube.com/watch?v=S-e4zMSvKf8&t=19s (Year: 2016).*

(Continued)

*Primary Examiner* — Tyler J Lee
*Assistant Examiner* — Tiffany P Ohman
(74) *Attorney, Agent, or Firm* — K&L Gates LLP

(57) ABSTRACT

A display mounting device is disclosed. The display mounting device includes a driving motor which provides a rotational driving force; and an arm unit which receives the rotational driving force and moves linearly in at least one zone, thereby becoming stretched or extended. The display mounting device further includes a display mount for receiving a display and for moving the display in coordination with the stretching or extension of the arm unit.

23 Claims, 17 Drawing Sheets

(51) Int. Cl.
    *G06T 7/50*                   (2017.01)
    *G06T 7/70*                   (2017.01)
    *F16M 11/04*               (2006.01)
    *F16M 11/10*               (2006.01)
    *F16M 11/28*               (2006.01)
    *G06T 7/11*                   (2017.01)
    *G06V 40/16*               (2022.01)
    *F16M 11/06*               (2006.01)
    *F16M 11/18*               (2006.01)
    *G06F 3/01*                   (2006.01)
    *G06T 7/521*                (2017.01)
    *H04N 5/655*               (2006.01)
    *G08B 21/04*               (2006.01)

(52) U.S. Cl.
    CPC ............. *F16M 11/06* (2013.01); *F16M 11/10* (2013.01); *F16M 11/18* (2013.01); *F16M 11/28* (2013.01); *G06F 3/012* (2013.01); *G06T 7/11* (2017.01); *G06T 7/50* (2017.01); *G06T 7/521* (2017.01); *G06T 7/70* (2017.01); *G06V 40/161* (2022.01); *F16M 2200/066* (2013.01); *G06T 2207/20021* (2013.01); *G06T 2207/30196* (2013.01); *G06T 2207/30201* (2013.01); *G08B 21/0446* (2013.01); *H04N 5/655* (2013.01)

(58) Field of Classification Search
    CPC . G06T 2207/20021; G06T 2207/30196; G06T 2207/30201; G06V 40/161; F16M 11/041; F16M 11/043; F16M 11/06; F16M 11/10; F16M 11/18; F16M 11/28; F16M 2200/066; G08B 21/0446; H04N 5/655
    USPC ........................................................ 700/275
    See application file for complete search history.

(56) References Cited

U.S. PATENT DOCUMENTS

| | | | |
|---|---|---|---|
| 6,695,274 | B1 | 2/2004 | Chiu |
| 6,736,364 | B2 | 5/2004 | Oddsen, Jr. |
| 7,061,753 | B2 | 6/2006 | Michoux et al. |
| 7,066,435 | B2 | 6/2006 | Oddsen, Jr. et al. |
| 7,088,577 | B2 | 8/2006 | Lauffer et al. |
| 7,289,315 | B2 | 10/2007 | Hillman et al. |
| 7,593,219 | B2 | 9/2009 | Quijano et al. |
| 7,637,463 | B2 | 12/2009 | Yen et al. |
| 7,690,611 | B2 | 4/2010 | Asamarai et al. |
| 7,780,125 | B2 | 8/2010 | Yen et al. |
| 8,091,842 | B2 | 1/2012 | Thomas et al. |
| 8,469,323 | B1 | 6/2013 | Deros et al. |
| 8,659,884 | B2 | 2/2014 | Segar et al. |
| 8,720,838 | B2 | 5/2014 | Bowman et al. |
| 8,794,579 | B2 | 8/2014 | Sturman et al. |
| 8,925,154 | B2 | 1/2015 | Ergun |
| 9,046,216 | B2 | 6/2015 | Lu et al. |
| 9,113,708 | B2 | 8/2015 | Yang et al. |
| 9,121,547 | B2 | 9/2015 | Lu et al. |
| 9,261,901 | B2 | 2/2016 | Truong |
| 9,266,243 | B2 | 2/2016 | Swartz et al. |
| 9,298,213 | B2 | 3/2016 | Khor et al. |
| 9,470,357 | B2 | 10/2016 | Hazzard et al. |
| 9,717,329 | B2 | 8/2017 | Hazzard et al. |
| 9,791,095 | B2 | 10/2017 | Chen et al. |
| 9,822,921 | B2 | 11/2017 | Chen et al. |
| D809,142 | S | 1/2018 | Lim et al. |
| 9,857,020 | B2 | 1/2018 | Yeh et al. |
| 10,104,957 | B2 | 10/2018 | Ergun et al. |
| 10,114,408 | B2 | 10/2018 | Ent et al. |
| 10,190,724 | B2 | 1/2019 | Yen et al. |
| 10,295,114 | B2 | 5/2019 | Yen et al. |
| 10,296,079 | B2 | 5/2019 | Han et al. |
| 10,309,578 | B2 | 6/2019 | Yen et al. |
| 10,344,909 | B2 | 7/2019 | Yen |
| 10,495,252 | B2 | 12/2019 | Lee et al. |
| 10,524,369 | B2 | 12/2019 | Chiu et al. |
| 10,648,611 | B2 | 5/2020 | Yen |
| 10,663,105 | B2 | 5/2020 | Chen et al. |
| 10,667,602 | B2 | 6/2020 | Hazzard et al. |
| 2005/0236533 | A1 | 10/2005 | McRight et al. |
| 2007/0102596 | A1 | 5/2007 | Sung |
| 2011/0147546 | A1 | 6/2011 | Monsalve et al. |
| 2013/0126685 | A1 | 5/2013 | Lucas et al. |
| 2014/0138506 | A1 | 5/2014 | Dahl et al. |
| 2015/0042556 | A1* | 2/2015 | Tao ...................... G06V 40/162 345/156 |
| 2016/0161943 | A1* | 6/2016 | Wikander ............. G06F 1/1681 318/3 |
| 2016/0183768 | A1 | 6/2016 | Kan et al. |
| 2017/0003712 | A1 | 1/2017 | Funk et al. |
| 2018/0232046 | A1* | 8/2018 | Han ....................... G06F 3/147 |
| 2019/0383436 | A1 | 12/2019 | Kang |
| 2020/0170406 | A1 | 6/2020 | Knapp et al. |
| 2020/0170407 | A1 | 6/2020 | Knapp et al. |
| 2020/0174515 | A1 | 6/2020 | So et al. |

FOREIGN PATENT DOCUMENTS

| | | |
|---|---|---|
| CN | 204515591 U | 7/2015 |
| CN | 109882702 A | 6/2019 |
| CN | 209893018 U | 1/2020 |
| CN | 111140737 A | 5/2020 |
| CN | 211344614 U | 8/2020 |
| EP | 1762771 A2 | 3/2007 |
| EP | 1821028 A1 | 8/2007 |
| EP | 1812745 B1 | 9/2017 |
| EP | 3306439 A1 | 4/2018 |
| EP | 2766785 B1 | 3/2019 |
| JP | 3499816 B2 | 2/2004 |
| JP | 2004-194270 A | 7/2004 |
| JP | 4169756 B2 | 10/2008 |
| JP | 2012024425 A | 2/2012 |
| JP | 5732551 B2 | 6/2015 |
| JP | 2019025183 A | 2/2019 |
| JP | 2020043527 A | 3/2020 |
| KR | 100315218 B1 | 2/2002 |
| KR | 20040032510 A | 4/2004 |
| KR | 100443979 B1 | 8/2004 |
| KR | 20040096097 A | 11/2004 |
| KR | 100565686 B1 | 3/2006 |
| KR | 100577234 B1 | 5/2006 |
| KR | 100593097 B1 | 6/2006 |
| KR | 100658837 B1 | 12/2006 |
| KR | 100662367 B1 | 1/2007 |
| KR | 100680176 B1 | 2/2007 |
| KR | 100767845 B1 | 10/2007 |
| KR | 10-0800074 B1 | 2/2008 |
| KR | 100813717 B1 | 3/2008 |
| KR | 10-0880458 B1 | 1/2009 |
| KR | 20090079474 A | 7/2009 |
| KR | 20090123394 A | 12/2009 |
| KR | 100955480 B1 | 4/2010 |
| KR | 20110026655 A | 3/2011 |
| KR | 20110071546 A | 6/2011 |
| KR | 10-2012-0084132 A | 7/2012 |
| KR | 101215461 B1 | 12/2012 |
| KR | 101237560 B1 | 2/2013 |
| KR | 20140123806 A | 10/2014 |
| KR | 20140131064 A | 11/2014 |
| KR | 101473006 B1 | 12/2014 |
| KR | 20160063668 A | 6/2016 |
| KR | 20160115052 A | 10/2016 |
| KR | 101699156 B1 | 1/2017 |
| KR | 20170017168 A | 2/2017 |
| KR | 101717348 B1 | 3/2017 |
| KR | 20170024661 A | 3/2017 |
| KR | 101788004 B1 | 10/2017 |
| KR | 20190052808 A | 5/2019 |
| KR | 20200080050 A | 7/2020 |
| KR | 102215561 B1 | 2/2021 |

(56) References Cited

FOREIGN PATENT DOCUMENTS

| KR | 20210065828 A | 6/2021 |
|----|---------------|--------|
| WO | 2020138840 A1 | 7/2020 |
| WO | 2020260941 A1 | 12/2020 |

OTHER PUBLICATIONS

Rodrigo M. Ruivo, Pedro Pezarat-Correia, Ana I. Carita, "Cervical and shoulder postural assessment of adolescents between 15 and 17 years old and association with upper quadrant pain," Jul.-Aug. 2014, Brazilian Journal of Physical Therapy, p. 364-371. (Year: 2014).*

Starico, "TV Monitor Viewing Distance Calculator," 2018, Starico, whole document. https://web.archive.org/web/20180527215542/https://stari.co/tv-monitor-viewing-distance-calculator (Year: 2018).*

GetPivo, "Pivo-Get Insanely Creative GIFs, Photos, and Videos—Indiegogo," Jan. 9, 2019, YouTube, whole video. https://www.youtube.com/watch?v=WDtMVVAfUkA (Year: 2019).*

Philips Monitors, "The Philips ErgoSensor—A Healthier Way of Working," Apr. 4, 2012, YouTube, whole video. https://www.youtube.com/watch?v=IP0cj7-gDJc (Year: 2012).*

International Search Report from corresponding International Patent Application No. PCT/KR2020/017089, dated Feb. 24, 2021.

Written Opinion of the International Searching Authority from corresponding International Patent Application No. PCT/KR2020/017089, dated Feb. 24, 2021.

Shin et al., "Slow Robots for Unobtrusive Posture Correction", CHI 2019, May 4-9, 2019, Glasgow, Scotland UK.

"Samsung C-Lab to Reveal Eight New AI Projects at CES 2019", Samsung Newsroom, published Dec. 26, 2018. Source: http://bit.ly/2EC2K2o.

"[GO! CES 2019] 'The Dignity of the C Lab Idea' Graces in Las Vegas (2)Hardware Pieces", Samsung Newsroom, published Dec. 27, 2018. Source: http://bit.ly/31Q2rKj.

Ergotron, "WorkFit-ST, Dual Monitor, Standing Desk Workstation," 2015 (Date found in product sheet PDF), Ergotron.com, Product description with manual downloads and videos, whole webpage. (Year: 2015).

* cited by examiner (a)  (b)

(c)

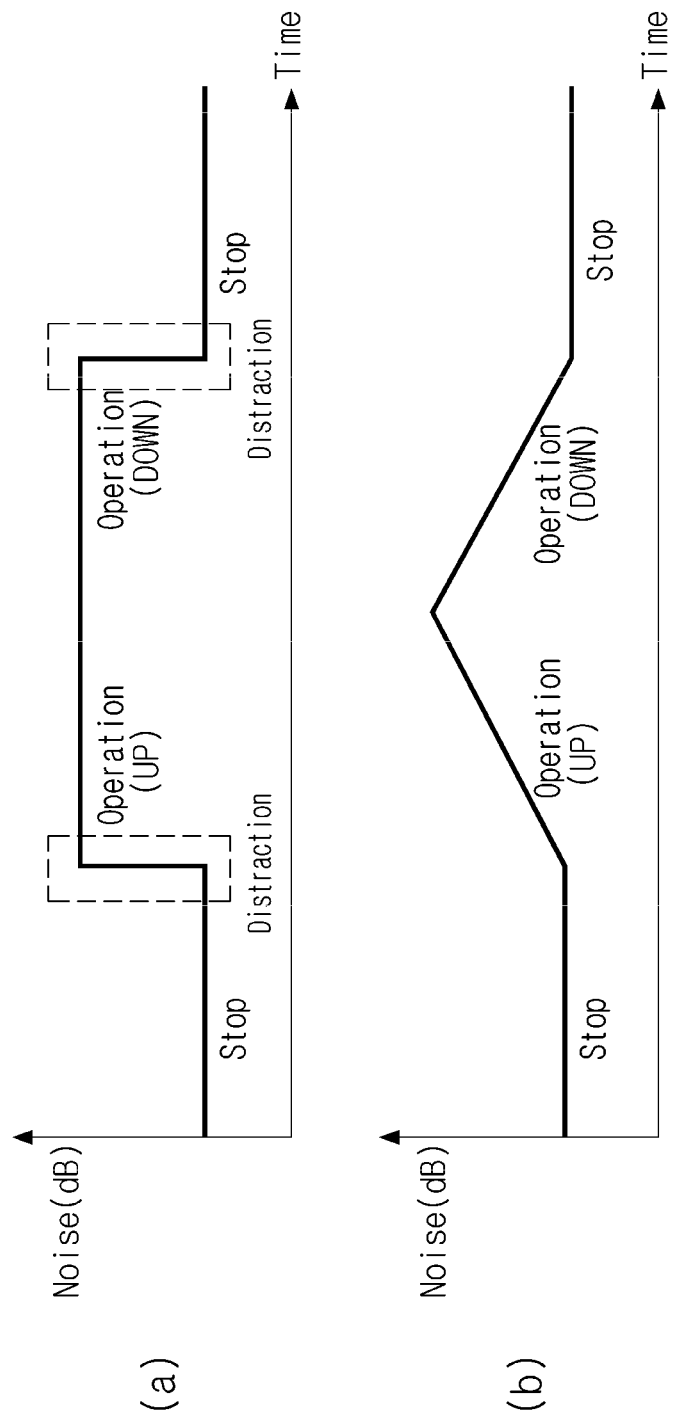

METHOD OF ADJUSTING LOCATION AND TILTING OF MONITOR

BACKGROUND

Technical Field

The present invention relates to a display mounting device for posture correction and a display mounting control system using the same, and more particularly, to a display mounting device for posture correction which moves a position of a display to correct a user's posture and a display mounting control system using the same.

Background Art

The contents described in this section merely provide background information on the present exemplary embodiment but do not constitute the related art.

Recently, as the use of mobile devices such as smart phones and tables has increased and TVs and monitors employing a flat panel display (FPD) have been widely distributed, the mobile devices or displays such as a FPD are being used in daily life.

SUMMARY

Users maintain an undesirable posture while using mobile devices for a long time and perform the work with a monitor which is installed on a desk so that the users perform the work with an undesirable posture for a long time. When the user lives in the wrong posture for a long time, problems such as discs may occur in the cervical vertebrae in the neck. Further, a disease such as a text neck syndrome that the cervical vertebrae in the neck does not maintain the normal shape, but is deformed in an abnormal shape may occur.

When a task is performed using a monitor, the position of the monitor is fixed so that if the user concentrates on the task, it is not easy to perform the task with an ideal posture. Further, it is not easy to consistently visit the hospital or exercise during the busy daily life. Even though a correction tool is used, it is only a one-time thing so that there is a limit to solving the fundamental problem.

Further, even though a position where the monitor or the TV is mounted is changed by a monitor or a TV stand, the monitor or the TV is fixed to one position so that it cannot fundamentally prevent an unconscious abnormal change of the posture of the user during the use.

Therefore, when the mobile devices are used for a long time, the imbalance of the posture is caused, so that a normal curve of the cervical vertebrae is lost, and a load which is three to four times higher than usual is transmitted to the neck, which cause the nerve damage, and head, neck, waist, and shoulder pains to cause poor concentration and chronic fatigue.

Technical Problem

Exemplary embodiments of the present invention have been contrived to solve the above-described problems and a main object of the present invention is to train a posture of the user using a display mounting device while using a mobile device to relieve the chronic fatigue and pains of the head, the neck, the shoulder, and the waist, and improve the concentration and the task efficiency.

Other and further objects of the present invention which are not specifically described can be further considered within the scope easily deduced from the following detailed description and the effect.

Technical Solution

According to an aspect of the present embodiment, the present invention provides a display mounting device, including: a driving motor which receives driving power and provides a rotational driving force; an arm unit which receives the rotational driving force and moves linearly in at least one zone, thereby becoming stretched or extended; and a display mount to which a display is fixed in order to mount the same and which moves the display in coordination with the stretching or extension of the arm unit.

According to another exemplary embodiment of the present invention, the present invention provides a display mounting control device, including: a position detecting unit which detects a position of a user who uses the display with respect to the display; a display mounting device which fixes the display, is provided to be stretched or extended by performing a linear motion in at least one zone by a rotational driving force generated by a driving motor, and moves the display; and a control unit which determines a posture of the user on the basis of the position of the user detected by the position detecting unit and controls the display mounting device to correct a posture of the user.

Advantageous Effects

As described above, according to the exemplary embodiment of the present invention, the present invention may prevent secondary disk metastasis to the neck and the waist by changing a position of the display to maintain an optimal state and correct the posture of the user without user's awareness using the user's unconscious following effect.

Further, according to the exemplary embodiments of the present invention, since the posture training is performed while using the display, the present invention may relieve the chronic fatigue and pains of the head, the neck, the shoulder, and the waist and improve the concentration and the task efficiency.

Even if the effects are not explicitly mentioned here, the effects described in the following specification which are expected by the technical features of the present disclosure and their potential effects are handled as described in the specification of the present disclosure.

BRIEF DESCRIPTION OF THE DRAWINGS

FIG. 17 includes diagrams showing a noise according to an operating time of a display mounting device for posture correction.

DETAILED DESCRIPTION

Figure 1:
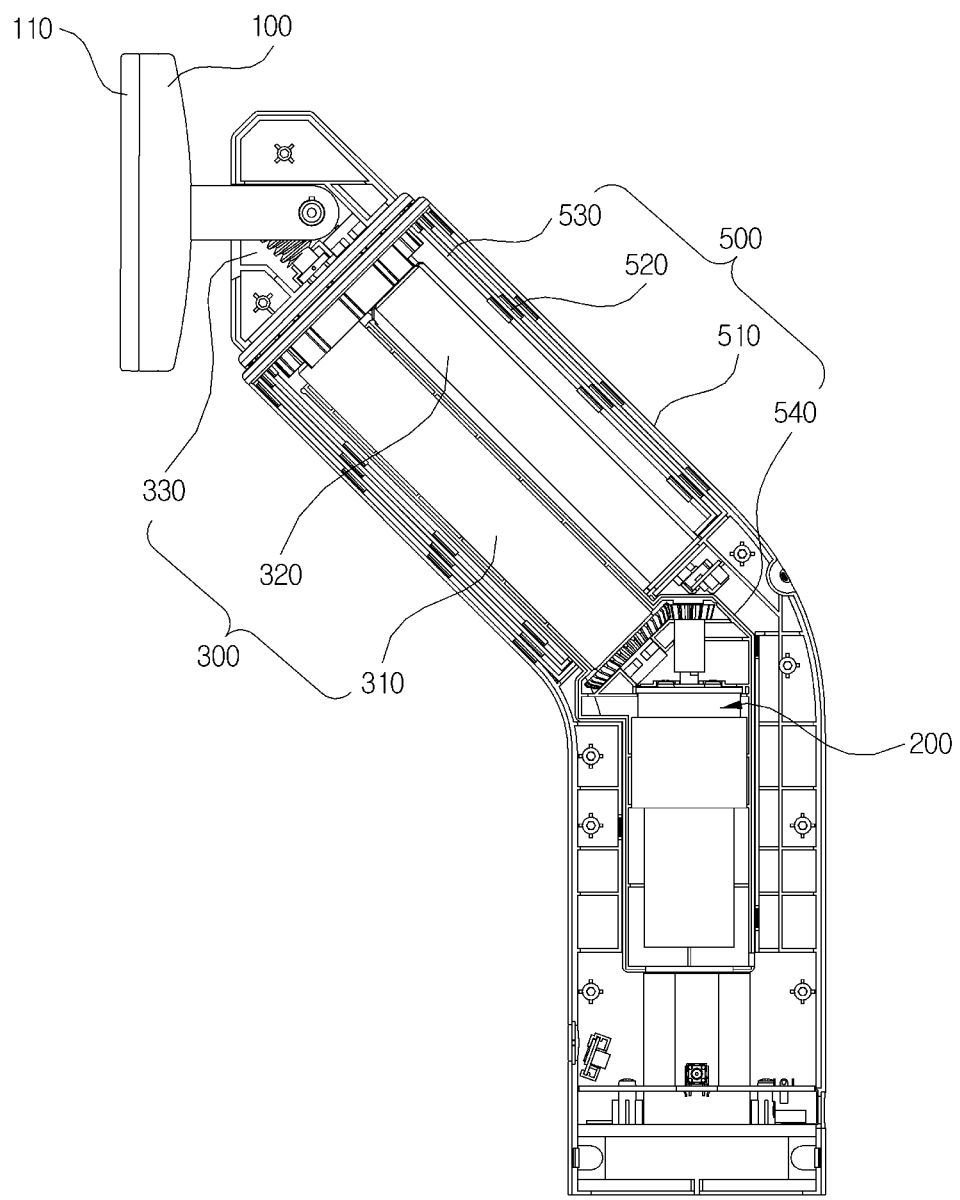
FIG. 1 is a view illustrating a display mounting device for posture correction according to an exemplary embodiment of the present invention.

Hereinafter, embodiments of the present invention will be described in detail with reference to the accompanying drawings. Advantages and characteristics of the present invention and a method of achieving the advantages and characteristics will be clear by referring to exemplary embodiments described below in detail together with the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the invention, and the present disclosure will be defined by the appended claims. Like reference numerals indicate like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

Terms used in the present application are just used to describe a specific exemplary embodiment and do not intend to limit the present invention and a singular expression may include a plural expression as long as it is not apparently contextually different. In the present invention, it should be understood that terminology "include" or "have" indicates that a feature, a number, a step, an operation, a component, a part or the combination thoseof described in the specification is present, but do not exclude a possibility of presence or addition of one or more other features, numbers, steps, operations, components, parts or combinations, in advance.

Terms including an ordinary number, such as first and second, are used for describing various constituent elements, but the constituent elements are not limited by the terms. The above terms are used only to discriminate one component from the other component. For example, without departing from the scope of the present invention, a first component may be referred to as a second component, and similarly, a second component may be referred to as a first component.

A term of and/or includes combination of a plurality of related elements or any one of the plurality of related elements.

The present invention relates to a display mounting device for posture correction and a display mounting control system using the same.

The display mounting device 10 for posture correction is a display mounting device which mounts a display such as a monitor used by a user for the task and corrects a posture of the user using a characteristic of the user who follows the display in a viewing angle without awareness and improves a disease which has been already generated and corrects the posture of the user using the same.

The display mounting device 10 for posture correction is created by adding a single motor to the display mounting device of the related art which mounts the display in a fixed position or does not have a driving force to move the display so that the user manually moves the display, to be driven at an angle of the display as well as the horizontal movement and the vertical movement and to be stably and accurately driven using the arm unit and the tilting unit.

The display mounting device 10 for posture correction is ergonomically designed to be installed in consideration of the distance between the display and the user and the display and the desk and also reflects a physical condition of each user.

The display mounting device 10 for posture correction may operate by a telescopic linear motion to diagonally lift the display by means of the arm unit and recognize the posture of the user and lift the display in an appropriate range through the recognized data so that the posture training may be performed very slowly at a speed which cannot be noticed by the user at a predetermined cycle. Here, the predetermined cycle is a cycle set by the user and is desirably 10 minutes.

The display mounting device 10 for posture correction maintains the position of the display in an optimal state in accordance with an environment in which the user uses the display, detects the posture of the user, easily varies the position of the display to correct the posture of the user, and corrects the posture of the user without user's awareness using the user's unconscious following effect. Further, the display mounting device 10 for posture correction may provide not only customized display mounting, but also a therapy effect of the disease, using various modes such as a mode for allowing the user to take a normal posture and a mode for relaxing or strengthening muscles around the neck.

The display mounting device 10 for posture correction uses one driving motor not only to vertically and horizontally move the display, but also to adjust a tilting angle of the display. Further, all components for driving the display are accommodated in a cylindrical housing to reduce a volume so that it is easy to install a mounting device and an extension block is additionally used to be optimized in accordance with the environment of the user.

FIG. 1 is a view illustrating a display mounting device for posture correction according to an exemplary embodiment of the present invention.

Referring to FIG. 1, the display mounting device 10 for posture correction includes a display mount 100, a driving motor 200, an arm unit 300, and a tilting unit 400. The display mounting device 10 for posture correction may omit some components among various components which are exemplarily illustrated in FIG. 1 or may further include other component.

According to the exemplary embodiment of the present invention, the display mounting device 10 for posture correction may further include a lead guide unit 347 fixed to the arm unit 300 and a lead screw 330 which is connected between the display mount 100 and the lead guide unit 347 and rotates according to a relative positional relationship with the lead guide unit 347 generated as the interval with the lead guide unit 347 changes. The display mount 100 moves as the lead screw 330 rotates. Here, the interval of the lead guide unit 347 indicates an interval formed to rotate the lead screw 300 by an interval of a pitch formed in the lead screw 330. Further, the relative positional relationship indicates a positional relationship formed as the lead screw 330 moves and rotates along the lead guide unit 347.

According to the exemplary embodiment of the present invention, the display mounting device 10 for posture correction includes a first link gear 322 which is directly or indirectly connected to a driving gear 210 of the driving motor 200 to receive a rotational driving force and rotates in a direction, a first link shaft 325 which linearly moves the arm unit 300 by the first link gear 322, the lead screw 330 which provides a rotational driving force to rotate the tilting unit 400 and forms a screw thread along the outside, and a lead guide unit 347 which rotates the lead screw 330 according to the rotational positional relationship as the first link shaft 325 linearly moves. Here, the direct or indirect connection to the driving gear 210 indicates that the first link gear 322 is directly connected to the driving gear 210 or indirectly connected by means of the second link gear 314.

The display mount 100 may fix the display to mount the display 20.

The display mount 100 further includes a mounting jig 110 which is fastened to the display 20 and the display mount 100.

The display mount 100 may move the display 20 in coordination with the stretching and the extension of the arm unit 300. Here, the "coordination" means that the arm unit 300 and the display mount 100 are connected to each other so that when the arm unit 300 moves, the display mount 100 also moves together.

The display mount 100 is connected to the display 20 by means of the mounting jig 110 and moves to adjust a tilting angle of the display 20 by an operation of stretching or extending the arm unit 300.

The driving motor 200 receives a driving power to provide a rotational driving force.

The arm unit 300 may be provided to receive the rotational driving force and move linearly in at least one zone to be stretched or extended. Here, in at least one zone, the arm unit 300 linearly moves to a predetermined height and then smoothly moves at the predetermined height or higher and a speed to the predetermined height and a speed at the predetermined height or higher may be different. For example, the speed to the predetermined height may be faster than the speed at the predetermined height or higher, but is not necessarily limited thereto.

The arm unit 300 may increase or decrease in length by the driving motor 200 and may be maintained in an elongated state.

The arm unit 300 includes a second driving assembly 310, a first driving assembly 320, and a lead screw 330.

The second driving assembly 310 is connected to the driving gear 210 of the driving motor 200 to receive the rotational driving force to rotate, be stretched or extended.

The second driving assembly 310 includes a rotary gear 312, a second link gear 314, a rotary shaft 318, a second link shaft 317, and a second housing 319.

The rotary gear 312 is connected to the driving gear 210 to receive a rotational driving force to rotate.

The second link gear 314 receives the rotational driving force by the rotary shaft 318 to rotate and is connected to the first driving assembly 320 to transmit the rotational driving force to the first driving assembly 320.

The rotary shaft 318 is connected and fixed to the second link gear 314 and rotates by the rotary gear 312 to linearly move the arm unit 300.

The second link shaft 317 is provided in the rotary shaft 318 to move along the screw thread formed in the rotary shaft 318 and stretch or extend the length.

The second housing 319 is connected and fixed to the rotary gear 312 and is assembled to include the rotary shaft 318 therein to rotate the rotary shaft 318 by the rotation of the rotary gear 312.

In the second driving assembly 310, the rotary gear 312 receives the rotational driving force to rotate the second housing 319 connected to the rotary gear 312 and the second link gear 314 connected to the rotary shaft 318 rotates along the second link shaft 317 as the rotary shaft 318 assembled by the second housing 319 to be included therein rotates.

In the second driving assembly 310, the second link gear 314 rotates along the screw thread of the second link shaft 317 to stretch or extend the length.

The first driving assembly 320 receives the rotational driving force from the second driving assembly 310 to rotate, be stretched or extended.

The first driving assembly 320 includes a first link gear 322, a first link shaft 325, and a first housing 326.

The first link gear 322 is connected to the second driving assembly 310 to receive the rotational driving force by means of the second driving assembly 310.

The first link shaft 325 is assembled with the first link gear 322 and the first link gear 322 moves along the screw thread to stretch or extend the length.

The first housing 326 is assembled to include the first link shaft 325 therein and is assembled to enclose the outer circumferential surface of an arm assembling unit 340 which encloses the first link shaft 325.

In the first driving assembly 320, the first link gear 322 receives the rotational driving force to rotate along the first link shaft 235 and stretch or extend the length and the first housing 326 is also stretched or extended along the arm assembling unit 340 as the first link shaft 325 is stretched or extended.

The lead screw 330 converts the rotational driving force of the second driving assembly 310 and the first driving assembly 320 into a linear motion.

The lead screw 330 includes a first screw 334, a second screw 332, and a bracket 336.

The first screw 334 rotates along a pitch interval by the rotation of the second driving assembly 310 and the first driving assembly 320.

The second screw 332 is connected to be in contact with the tilting unit 400 and rotates with the first screw 334 engaged therewith by the rotation of the first screw 334.

The bracket 336 connects the first screw 334 and the second screw 332 and supports the first screw 334 and the second screw 332.

The arm unit 300 further includes an arm assembling unit 340 which accommodates and fixes the second driving assembly 310, the first driving assembly 320, and the lead screw 330.

The arm assembling unit 340 includes link bodies 342 and 344 which are assembled to fix the first link gear 322 of the first driving assembly 320 and the second link gear 324 of the second driving assembly 310 to be in contact with each other and the lead guide unit 347 formed on the link bodies 342 and 344.

The tilting unit 400 tilts the display mount 100 in coordination with the stretching or extending operation of the arm unit 300. The tilting unit 400 may tilt the display mount 100 according to the rotation from the lead screw 330. Accordingly, the tilting unit 400 adjusts an angle of the display 20 in accordance with a field of vision.

A tilting angle of the tilting unit 400 may be adjusted by rotating a worm wheel which is perpendicularly connected to the lead screw 330 by the rotation of the lead screw 330 according to the linear motion of the arm unit 300. Here, the tilting unit 400 may be implemented by the worm wheel, but is not necessarily limited thereto and may be implemented by a wheel which is engaged with the lead screw 330 to tilt the display mount 100 connected to the tilting unit 400.

FIGS. 2 to 7 are views specifically illustrating components of a display mounting device for posture correction according to an exemplary embodiment of the present invention.

Figure 2:
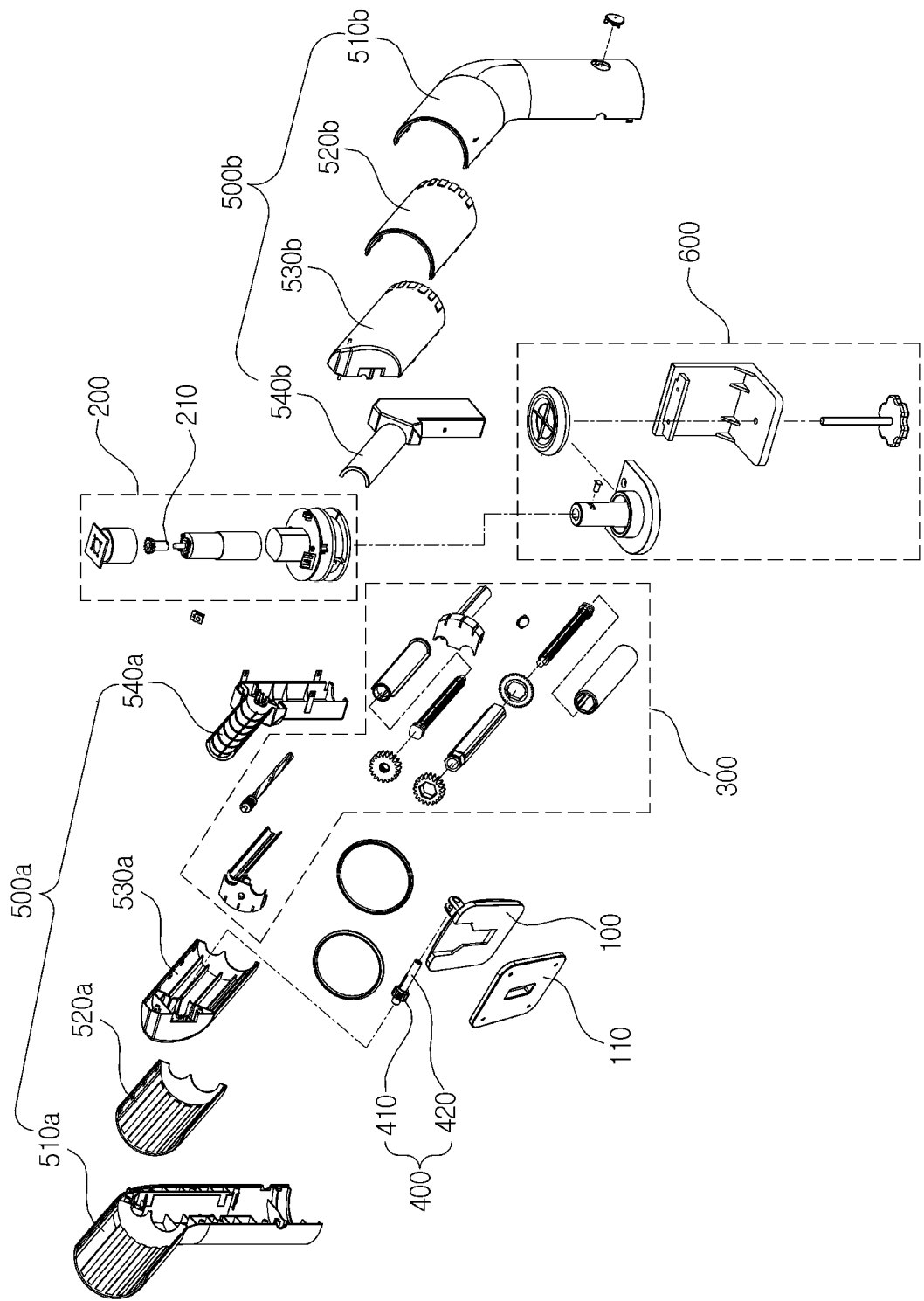
FIGS. 2 to 7 are views specifically illustrating components of a display mounting device for posture correction according to an exemplary embodiment of the present invention.
Figure 3:
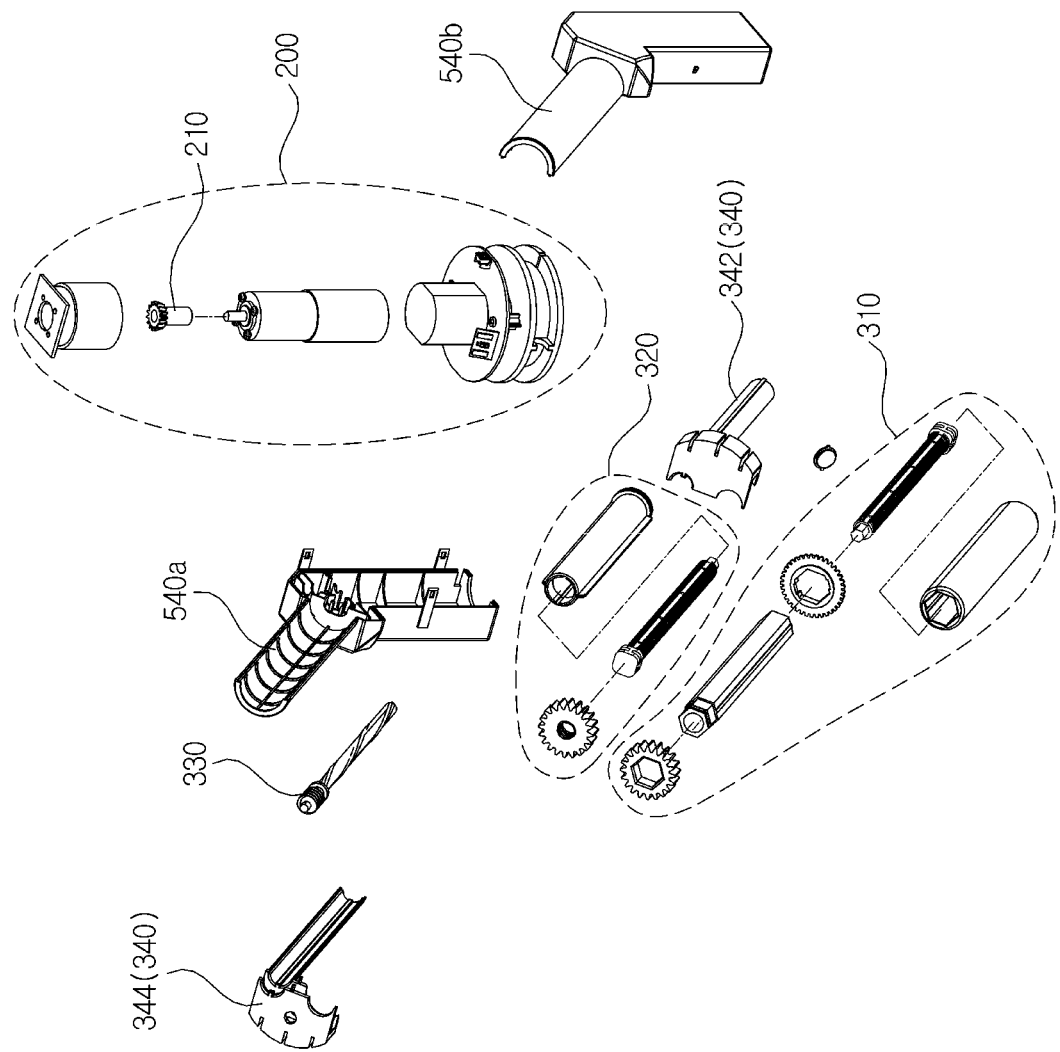

FIG. 2 is a view illustrating entire components of a display mounting device for posture correction according to an exemplary embodiment of the present invention and FIG. 3 is a view illustrating main components of a display mounting device for posture correction according to an exemplary embodiment of the present invention.

The display mounting device 10 for posture correction includes a display mount 100, a driving motor 200, an arm unit 300, and a tilting unit 400. The display mounting device 10 for posture correction may omit some components among various components which are exemplarily illustrated in FIG. 2 or may further include other component.

The display mount 100, the driving motor 200, the arm unit 300, and the tilting unit 400 are provided in a mount housing 500. Here, the mount housing 500 is a component which forms an outer appearance of the display mounting device 10 for posture correction.

The display mount 100 may install and fix the display 20 to mount the display 20 to be used by the user.

The driving motor 200 may provide a driving force to horizontally/vertically move the display 20 equipped in the display mount 10 and adjust a tilting angle.

The driving motor 200 may provide a driving force required to linearly move the display 20 in a predetermined direction and adjust the tilting angle of the display 20.

An output to smoothly drive the driving motor 200 is determined according to a weight of the display 20 to be equipped so that the display mounting device 10 for posture correction determines a maximum weight of the display 20 to be equipped in advance and selects a driving motor 200 having an appropriate output according to the weight.

Further, the driving motor 200 is roughly divided into a DC motor and an AC motor and there are various driving motors according to a durability and a driving precision so that it is desirable to select an appropriate motor in accordance with the environment in which the display mounting device 10 for posture correction is used. However, when it is considered that a driving device for the display mounting device of the present disclosure is used for the display mounting device 10 which is installed on a TV stand and a size of the display mounting device 10 is not large, it is desirable to select a driving motor 200 which is not large and also desirable to select a driving motor 200 which has a low noise rather than the large driving force.

In the display mounting device 10 for posture correction, the linear motion such as horizontal/vertical movement and a rotational motion such as tilting angle adjustment need to be simultaneously performed by one driving motor 200. Further, the driving motor 200 is a heavier component among the components of the display mounting device 10 so that in order to stably operate the display mounting device 10, the driving motor 200 may be provided below the display mounting device 10 to be adjacent to the fixing mount 600 which fixes the mounting device.

The arm unit 300 converts the rotational driving force of the driving motor 200 into a linear driving force to move the equipped display 20 in a predetermined direction, that is, a direction in which the horizontal movement and the vertical movement are simultaneously performed.

The arm unit 300 converts the rotational motion generated from the driving motor 200 into a linear motion. A configuration which converts the linear motion into the rotational motion is roughly divided into a ball screw and a lead screw. The ball screw is precisely and smoothly driven, but is expensive and the lead screw has a less durability but is cheap so that the screws may be selected according to the environment and the purpose that the display mounting device 10 is used.

It may be more effective for he display mounting device 10 to use a lead screw 330 having a relatively low noise, a low price, and a relatively simple configuration, but is not necessarily limited thereto.

It is effective that the display mounting device 10 performs the linear movement and adjust the tilting angle by one driving motor 200 and the display 20 not only horizontally moves, but also vertically moves so that in order to efficiently perform vertical motion and horizontal motion at one time, the linear motion is desirably performed by being tilted at a predetermined angle.

Accordingly, the arm unit 300 of the present invention connects the second driving assembly 310, the first driving assembly 320, and the lead screw 330 which transmit the rotational driving force to the driving motor 200 provided therebelow to provide the driving force.

The tilting unit 400 interworks with the arm unit 300 and adjusts the tilting angle of the display 20 according to the linear motion of the arm unit 300.

According to the exemplary embodiment of the present invention, the tilting unit 400 includes a tilting wheel 410 and a tilting shaft 420. The tilting unit 400 may omit some components among various components which are exemplarily illustrated in FIG. 2 or may further include other component.

The tilting wheel 410 rotates by being engaged with the first link gear 332 of the lead screw 330 and is implemented by a worm wheel.

The tilting shaft 420 is coupled to pass through a center of the tilting wheel 410 and is connected to the display mount 10 to tilt the display mount 100 while rotating together by the rotation of the tilting wheel 410. Specifically, the tilting shaft 420 forms a protrusion on a side surface to be slidably coupled to a groove formed on the display mount 100 to be fixed.

The tilting unit 400 adjusts the tilting angle of the display 20 in coordination with the linear motion of the arm unit 300. When the display 20 moves toward the user and is maintained in a vertical state, a posture that looks at the display 20 is not normal as well as inconvenient to use so that it is necessary to appropriately maintain a user's viewing angle for the display 20 by tilting an upper portion of the display 20 toward the user while moving the display 20 toward the user. To this end, it is necessary to adjust the tilting angle of the display 20 in coordination with the linear motion by the arm unit 300 and the tilting angle may be adjusted by the tilting unit 400.

In order to adjust the tilting angle using one driving motor 200, one end of the second driving assembly 310 is coupled to the driving motor 200 and the other end is connected to the first driving assembly 320 and the length of the arm unit 300 may be stretched or extended while rotating the lead screw 330 by the second driving assembly 310 and the first driving assembly 320. Here, the lead screw 330 rotates to rotate the worm wheel of the tilting unit 400 to tilt the display 20. That is, the lead screw 330 and the tilting unit 400 interwork to convert the linear motion into the rotational motion, which is used to adjust the tilting angle by means of the worm wheel in the tilting unit 400.

Referring to FIG. 2, the mount housing 500 is a component which forms an outer appearance of the display mounting device 10 for posture correction. The mount housing 500 is formed to have a cylindrical shape to provide a design element and increase a storage efficiency of the components accommodated therein, such as the driving motor 200, the arm unit 300, and the tilting unit 400 and reduce the entire device size. However, the outer appearance of the display mounting device 10 is not necessarily limited thereto.

The mount housing 500 includes a first column part 510, a second column part 520, a third column part 530, and a fourth column part 540. The mount housing 500 may omit some components among various components which are exemplarily illustrated in FIG. 2 or may additionally include other component.

The first column parts 510a and 510b form an outer appearance of the outermost part of the display mounting device 10 and the fourth column parts 540a and 540b are assembled in the first column parts 510a and 510b.

Here, the driving motor 200 and the second driving assembly 310 of the arm unit 300 may be fixed to the fourth column parts 540a and 540b.

The second column parts 520a and 520b are assembled on the upper ends of the first column parts 510a and 510b and the third column parts 530a and 530b are assembled on the upper ends of the second column parts 520a and 520b. Here, when the arm unit 300 is stretched, the second column parts 520a and 520b are stretched along the first column parts 510a and 510b and the third column parts 530a and 530b are stretched along the second column parts 520a and 520b. By doing this, the display mounting device 10 for posture correction may be extended or contracted in three stages, but is not necessarily limited thereto and may be extended or contracted in a plurality of stages by changing a structure of the gear provided in the arm unit 300 and a structure of the mount housing.

A fixing mount 600 may fix the display mounting device 10 to a desk or a TV stand to be installed. The fixing mount 600 may be implemented by any component which fixes the display mounting device 10 and may be provided as a clamp to stably install the display 20 in consideration of the weight of the display 20, but is not necessarily limited thereto.

The fixing mount 600 may be fixed to be connected to the driving motor 200 and provided in the first column parts 510a and 510b.

According to the exemplary embodiment of the present invention, a position detecting unit 30 and a control unit 32 may be located in the fixing mount 600, but it is not necessarily limited thereto.

According to the exemplary embodiment of the present invention, as long as the fixing mount fixes the display mounting device 10, the shape of the fixing mount 600 is not specifically limited, and the fixing mount may be provided as a clamp to stably install the display 20 in consideration of the weight of the display 20, but is not necessarily limited thereto.

Further, the environment that the display mounting device 10 is installed may vary so that an extension block (not illustrated) which extends the driving device in a vertical direction and a horizontal direction may be further installed. The extension block may be manufactured to have the same shape as the mount housing 500 to extend the driving device in a vertical direction and may be manufactured to have a planar shape to extend the driving device in a horizontal direction, but is not necessarily limited thereto. Specifically, the extension block has a predetermined length and a predetermined height to adjust a height and a depth of the display mounting device 10 and may be located between the driving motor 200 and the fixing mount 600. For example, the extension block is located in a horizontal direction to form the driving motor 200 and the arm unit 300 to be formed in front of or behind the position fixed by the fixing mount 600.

Figure 4:
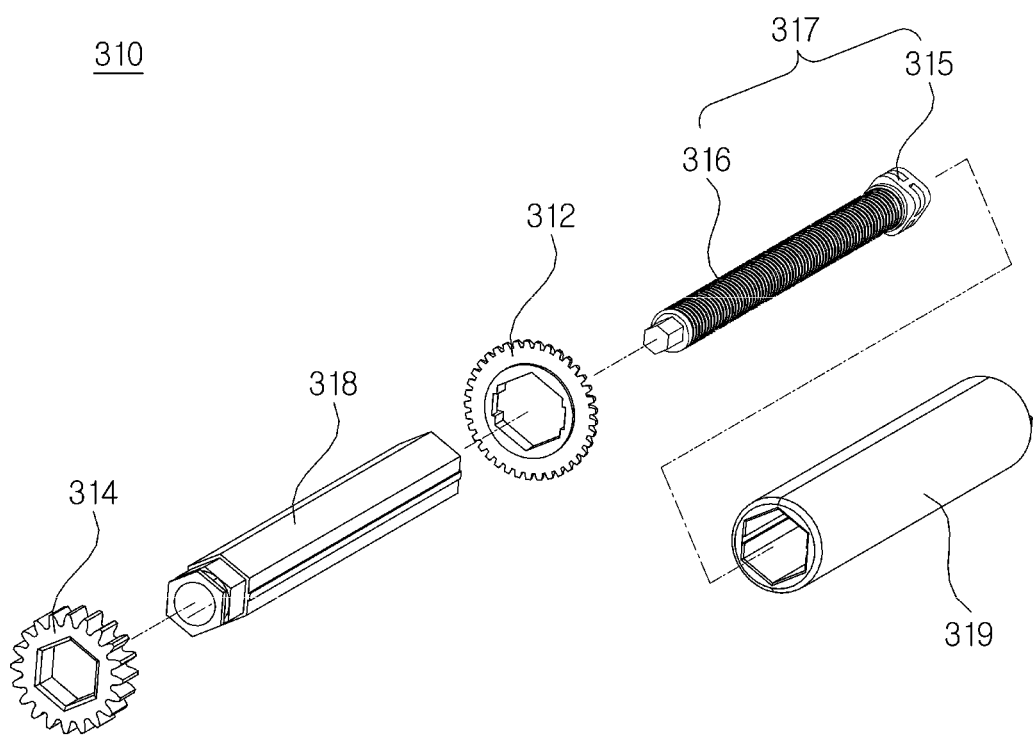

FIG. 4 is a view illustrating a second driving assembly of a display mounting device for posture correction according to an exemplary embodiment of the present invention.

The second driving assembly 310 includes a rotary gear 312, a second link gear 314, a rotary shaft 318, a second link shaft 317, and a second housing 319. The second driving assembly 310 may omit some components among various components which are exemplarily illustrated in FIG. 4 or may further include other component.

The rotary gear 312 is located to be in contact with the driving gear 210 of the driving motor 200 and receives a power generated by the driving motor 200. Here, the rotary gear 312 forms protrusions with the same interval as the driving gear 210 to be engaged and rotate to transmit the power without causing the energy loss.

According to the exemplary embodiment of the present invention, the rotary gear 312 may be formed as a spur gear, but is not necessarily limited thereto.

The rotary gear 312 may be fixed to the second housing 319.

According to the exemplary embodiment of the present invention, the rotary gear 312 is coupled to one surface of the second housing 319 and coupled by forming grooves therein. For example, the rotary gear 312 forms a hexagonal shape therein and forms grooves on two facing surfaces to be coupled and fixed to the second housing 319. Here, an inner shape of the rotary gear 312 is not necessarily limited to the hexagonal shape and may be formed to have the same shape as the shape of an outer surface of the rotary shaft 318.

The second link gear 314 is connected to the rotary shaft 318 and fixed to the rotary gear 312 to rotate as the rotary shaft 318 rotates. Here, the second link gear 314 forms protrusions having the same interval as the first link gear 322 to be engaged and rotate to transmit the power to the first link gear 322 without causing the energy loss.

According to the exemplary embodiment of the present invention, even though it is illustrated that the second link gear 314 forms a hexagonal shape therein, it is not necessarily limited thereto and may be assembled by forming the same shape as the shape of the outer circumferential surface of the rotary shaft 318.

The rotary shaft 318 forms a hexagonal shape. Here, even though it is illustrated that the rotary shaft 318 forms a hexagonal shape, it is not limited thereto and may form a polygonal shape.

According to the exemplary embodiment of the present invention, when the rotary shaft 318 is formed in a circle, the rotary shaft may not rotate as the second housing 319 coupled to the rotary shaft 318 rotates. Accordingly, the rotary shaft 318 is formed to have a polygonal shape to be coupled to the second housing 319 to rotate together as the second housing 319 rotates.

The rotary shaft 318 forms grooves on two opposing surfaces. Here, the grooves formed on two opposing surfaces may be coupled to be in contact with the protrusions formed on the inside of the second housing 319. Accordingly, the rotary shaft 318 is coupled to the grooves formed on two opposing surfaces through the protrusions to rotate together by the rotation of the second housing 319.

The second link shaft 317 includes a second link bracket 315 and a second shaft 316.

The second link bracket 315 may be formed to fix the second driving assembly 310 to the mount housing 500. For example, the second link bracket 315 is formed in a rectangular parallelepiped shape and forms grooves except for the center of each side surface and assembled and fixed to the house housing 500 through the groove formed except for the center.

The second shaft 316 is coupled to a lower end of the second link bracket 315 and forms a screw thread around the shaft formed in a cylindrical shape. The screw thread formed on the second shaft 316 may be implemented to rotate by being engaged with the screw thread formed inside the rotary shaft 318, which stretches or extends the second link shaft 317.

The second housing 319 is connected to the rotary gear 312 and is implemented to enclose the rotary shaft 318. Specifically, the second housing 319 is coupled to locate the rotary shaft 318 therein and forms the same inner shape so as to transmit the rotational driving force received from the rotary gear 312 to the rotary shaft 318.

According to the exemplary embodiment of the present invention, even though it is illustrated that the second housing 319 is formed in a cylindrical shape, it is not necessarily limited thereto.

Figure 5:
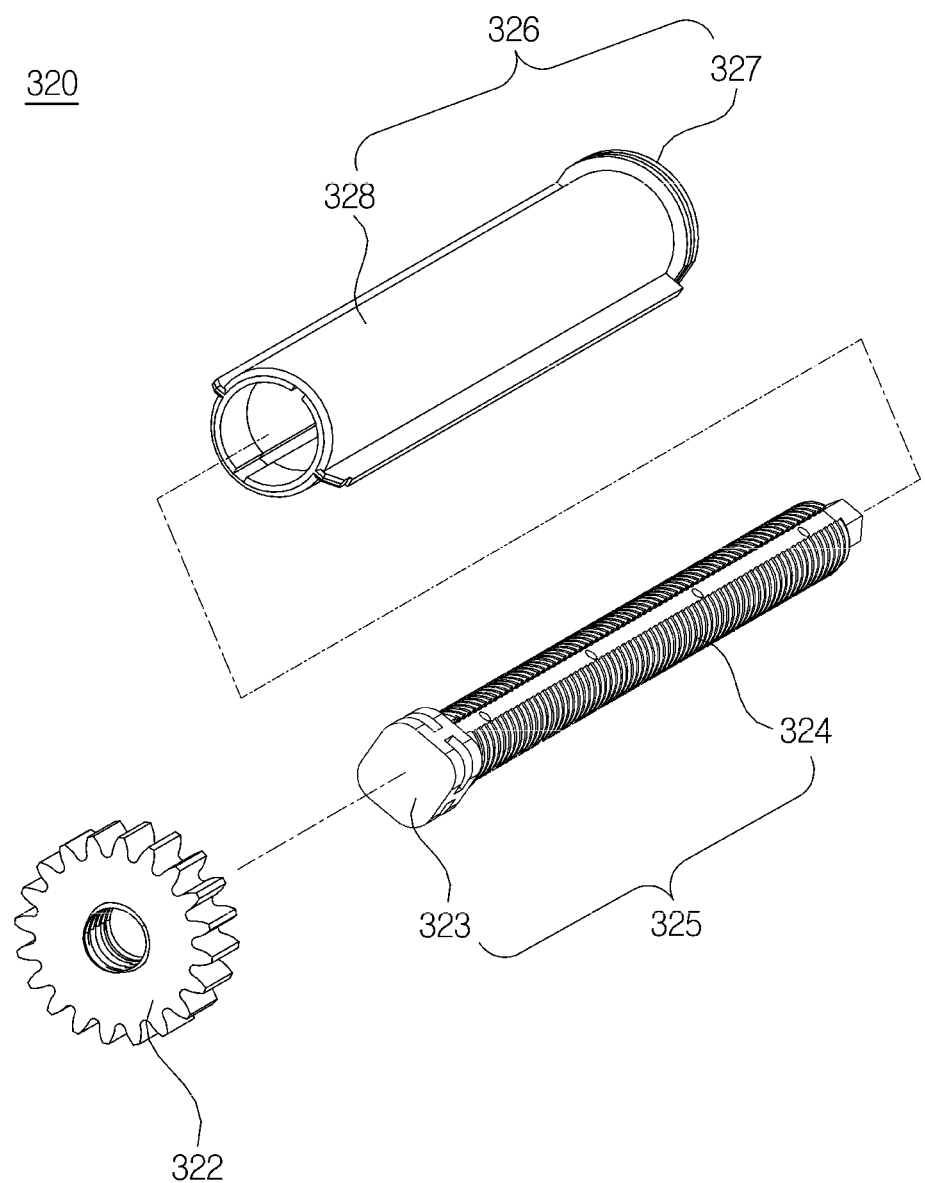

FIG. 5 is a view illustrating a first driving assembly of a display mounting device for posture correction according to an exemplary embodiment of the present invention.

The first driving assembly 320 includes a first link gear 322, a first link shaft 325, and a first housing 326. The first driving assembly 320 may omit some components among various components which are exemplarily illustrated in FIG. 5 or may further include other component.

The first link gear 322 is located to be in contact with the second link gear 314 of the second driving assembly 310 and receives the power generated by the driving motor 200 through the second link gear 314 assembled in the rotary shaft 318 provided in the second housing 319 connected to the rotary gear 312. Here, the first link gear 322 forms protrusions having the same interval as the second link gear 314 to be engaged and rotate to transmit the power without causing the energy loss.

The first link gear 322 forms the screw thread therein and is coupled to the first link shaft 325 to move along the screw thread formed on the first link shaft 325.

The first link shaft 325 includes a first link bracket 323 and a first shaft 324.

The first link bracket 323 may be formed to fix the first driving assembly 320 to the mount housing 500. For example, the first link bracket 323 is formed in a rectangular parallelepiped shape and forms grooves except for the center of each side surface and assembled and fixed to the house housing 500 through the groove formed except for the center.

The first shaft 324 is coupled to a lower end of the first link bracket 323 and forms a screw thread around the shaft formed in a cylindrical shape. The screw thread formed on the first shaft 324 may be implemented to rotate by being engaged with the screw thread formed inside the first link gear 322, which stretches or extends the arm unit 300.

According to the exemplary embodiment of the present invention, the screw thread formed on the first shaft 324 may form the grooves in the length direction of the first shaft 324. Here, the grooves formed in the length direction may be formed in an opposing position of the cylindrical first shaft 324 and may be implemented to be assembled to be in contact with the protrusions formed on the arm assembling unit 340.

Specifically, the grooves formed in the length direction are fixed to the protrusions formed on the arm assembling unit 340 and the first shaft 324 may move along the grooves as the first link gear 322 rotates. Here, the position in which the arm assembling unit 340 is fixed may not be changed.

When the first link gear 322 and the first link shaft 325 are assembled by the arm assembling unit 340, the first housing 326 may be implemented to enclose the upper end of the arm assembling unit 340.

The first housing 326 is formed in a cylindrical shape and includes a cylindrical shaft 328 and a cylindrical bracket 327.

Here, the cylindrical bracket 327 may be formed to fix the first driving assembly 320 to the mount housing 500. For example, the cylindrical bracket 327 is formed in a cylindrical shape and forms grooves along the circle on the side surface. At this time, the cylindrical bracket may be assembled in the mount housing 500 to be fixed by means of the formed grooves.

The cylindrical shaft 328 is coupled to the lower end of the cylindrical bracket 327 and forms grooves in the shaft formed in cylindrical shape to be coupled to the arm assembling unit 340. Here, the grooves may be formed in the length direction of the cylindrical shaft 328, but is not necessarily limited thereto.

Even though it is illustrated that the cylindrical shaft 328 forms protrusions in the length direction in an opposing position of the outer circumferential surface, the protrusions may not be formed.

Figure 6:
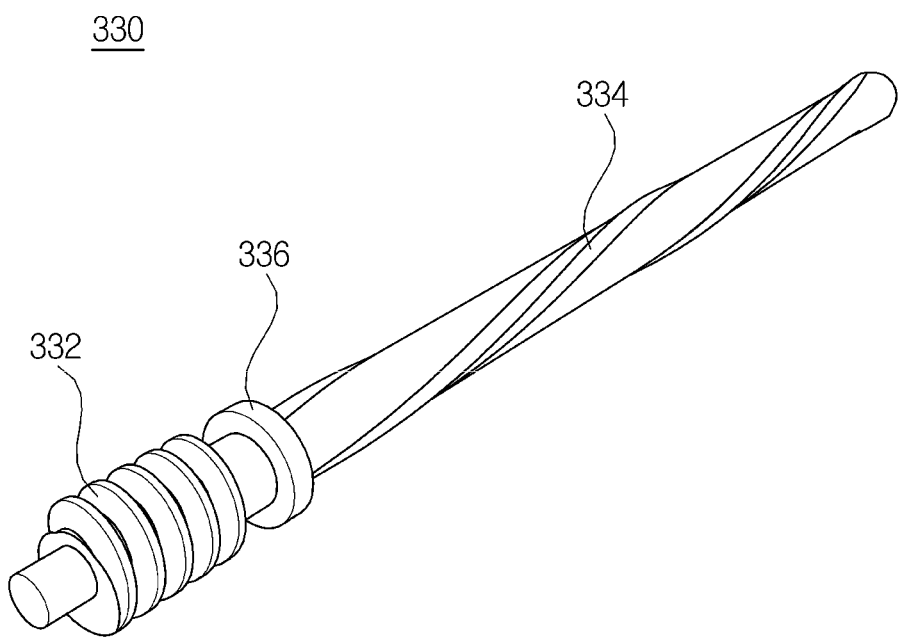

FIG. 6 is a view illustrating a lead screw of a display mounting device for posture correction according to an exemplary embodiment of the present invention.

The lead screw 330 includes a first screw 334, a second screw 332, and a bracket 336. The lead screw 330 may omit some components among various components which are exemplarily illustrated in FIG. 6 or may further include other component.

The first screw 334 may be implemented by setting the interval between pitches to be larger than the interval between pitches of the second screw 322.

The tilting angle of the display mount 100 may be adjusted by the interval between pitches of the first screw 334 so that the larger the interval, the slower the display mount 100 moves and the smaller the interval, the faster the display mount 100 moves.

Accordingly, the lead screw 330 may adjust the angle of the display mount 100 by the interval between pitches of the first screw 334.

The second screw 332 is coupled to be in contact with the tilting unit 400 and rotates the tilting unit 400 to being rotated by the first screw 334.

The bracket 336 may connect the first screw 334 and the second screw 332. Here, the bracket 336 may be coupled to be in assembled in the arm assembling unit 340. Specifically, the bracket 336 may be coupled by the grooves formed in the arm assembling unit 340. Further, a portion which is formed in a cylindrical shape at the upper end of the second screw 332 of the lead screw 330 may be formed to be fixed to the arm assembling unit 340 and prevents the lead screw 330 from being deviated.

Figure 7:
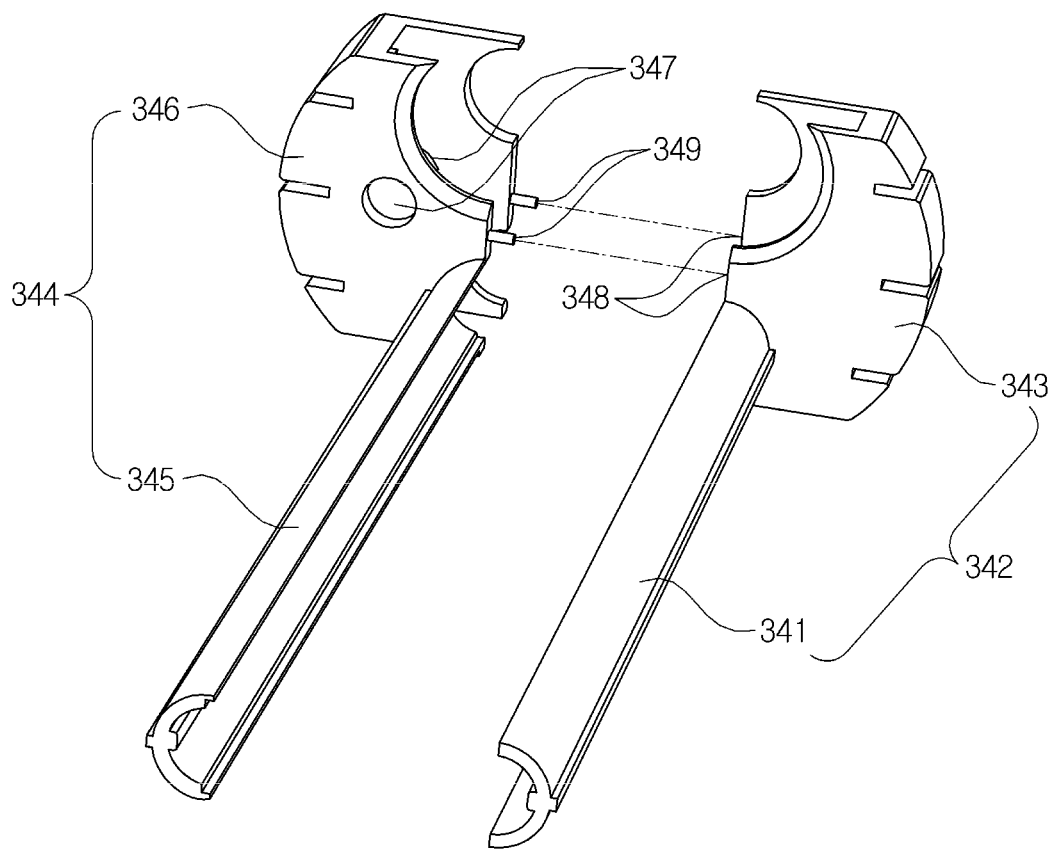

FIG. 7 is a view illustrating an arm assembling unit of a display mounting device for posture correction according to an exemplary embodiment of the present invention.

The arm assembling unit 340 includes a first link body 342, a second link body 344, and a lead guide unit 347. The arm assembling unit 340 may omit some components among various components which are exemplarily illustrated in FIG. 7 or may further include other component.

The first link body 342 may be coupled to the second link body 344 to be assembled such that the second link gear 314 of the second driving assembly 310 and the first link gear 322 of the first driving assembly 320 are assembled to be engaged.

According to the exemplary embodiment of the present invention, the first link body 342 may be formed to have the same shape as the second link body 344. Specifically, the first link body 342 may be coupled to the second link body 344 to fix the second link gear 314 and the first link gear 322 as one assembly and a cylindrical groove 348 and to this end, a cylindrical protrusion 349 may be formed in a portion to be coupled.

Here, the cylindrical protrusion 349 may be formed to have the same shape as the cylindrical groove 348. The cylindrical protrusion is coupled to the cylindrical groove 348 without forming a space so that the first link body 342 and the second link body 344 may be fixed to be in contact with each other.

The first link body 342 may include a first arm guide 341 and a first arm body 343. The second link body 344 may include a second arm guide 345 and a second arm body 346.

The first arm guide 341 may be connected to the first arm body 343 equipped with the first driving assembly 320 and the second guide 345 may be connected to the second arm body 346 equipped with the second driving assembly 310.

In the first arm guide 341, the first shaft 324 of the first link shaft 325 of the first driving assembly 320 is located and the first arm guide 341 is assembled with the second arm guide 345 to be fixed. Here, in the first arm guide 341 and the second arm guide 345, the protrusion have the same shape as the groove is formed in the length direction of the first axis 324 formed on the screw thread of the first shaft 324 to couple and fix the groove and the protrusion.

The first arm body 343 and the second arm body 346 may form a plurality of grooves to be fixed to the mount housing 500. According to the exemplary embodiment of the present invention, the first arm body 343 and the second arm body 346 may form three grooves, but is not necessarily limited thereto.

The first arm body 343 and the second arm body 346 are assembled such that the second driving assembly 310 and the first driving assembly 320 are engaged.

The second link body 344 may have a lead guide unit 347. Specifically, the second arm body 346 may have the lead guide unit 347. Here, the lead guide unit 347 does not overlap a portion in which the second link gear 314 assembled in the second arm body 346 and the first link gear 322 are assembled to be fixed and may be located at the center of the second arm body 346, but is not necessarily limited thereto.

The lead guide unit 347 is a portion to which the lead screw 330 is rotatably assembled to be coupled and forms a screw thread to rotate the first screw 334 of the lead screw 330 as the second driving assembly 310 and the first driving assembly 320 linearly moves by the second link gear 314 and the first link gear 322. Specifically, the screw thread formed on the lead guide unit 347 may be formed to move the lead guide unit 347 along the pitch of the first screw 334.

Figure 8:
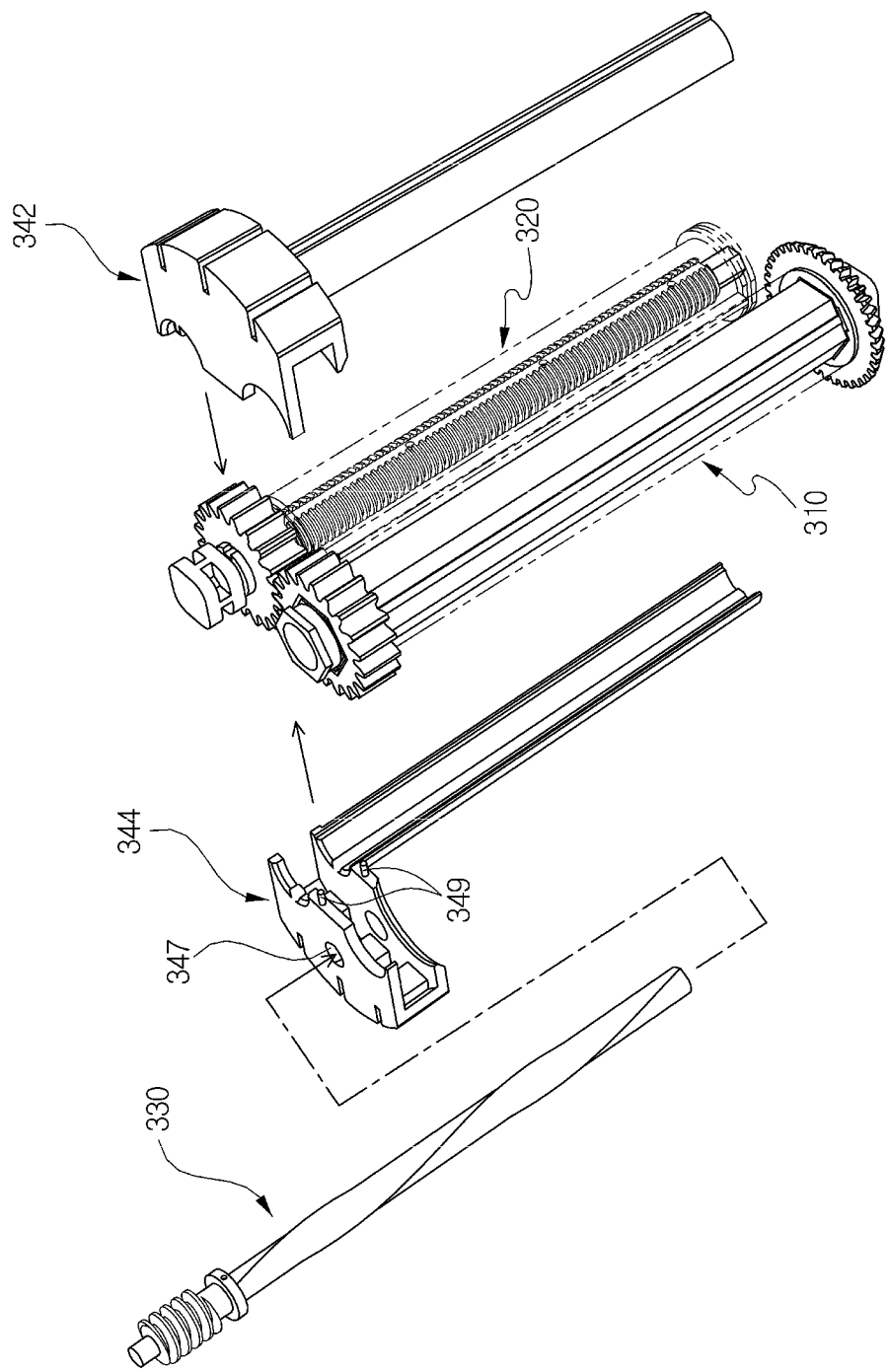
FIGS. 8 and 9 are views illustrating coupling between components of an arm unit of a display mounting device for posture correction according to an exemplary embodiment of the present invention.
Figure 9:
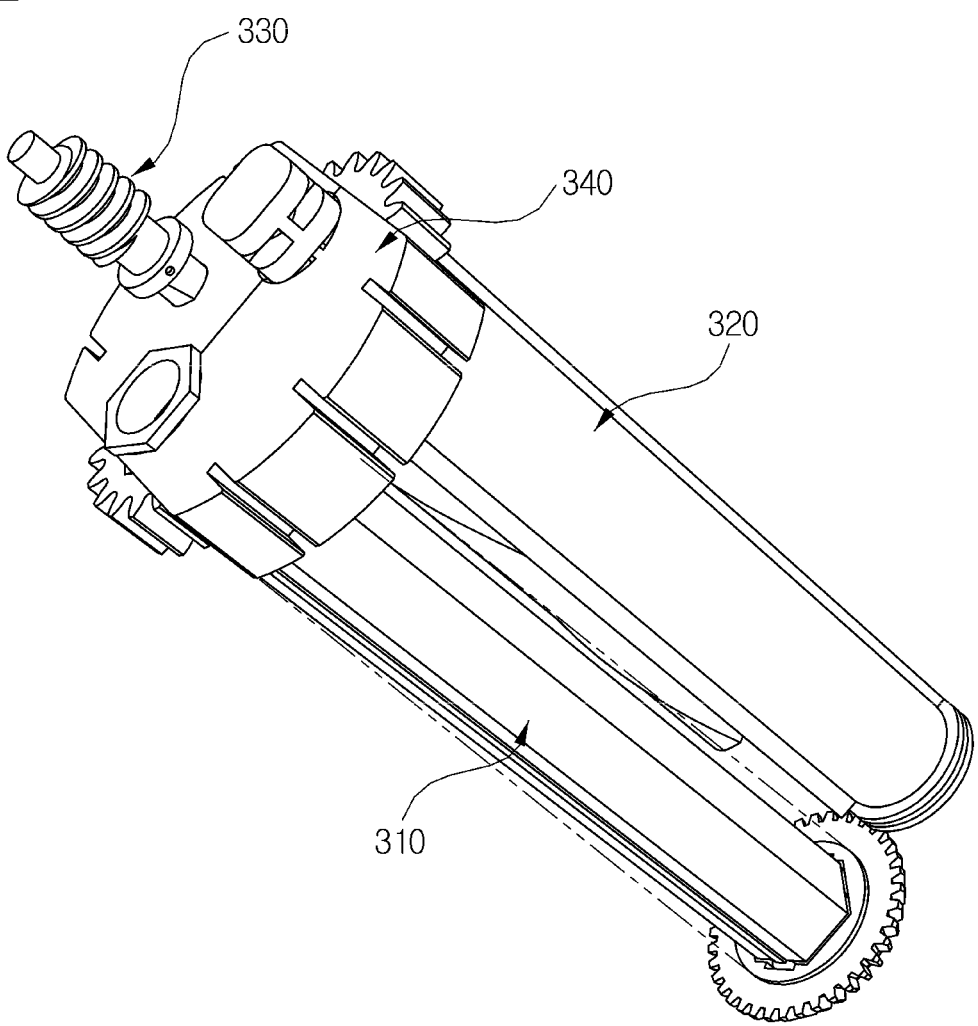

FIGS. 8 and 9 are views illustrating coupling between components of an arm unit of a display mounting device for posture correction according to an exemplary embodiment of the present invention.

FIG. 8 is a view illustrating a form for assembling the second driving assembly 310, the first driving assembly 320, and the lead screw 330 to the arm assembly 340 according to the exemplary embodiment of the present invention. FIG. 9 is a view illustrating a form that the second driving assembly 310, the first driving assembly 320, and the lead screw 330 are assembled to the arm assembly 340 according to the exemplary embodiment of the present invention.

The second assembly 310 and the first driving assembly 320 may be assembled as one assembly by the first link body 342 and the second link body 344. Specifically, the arm assembling unit 340 may be assembled such that the second link gear 314 of the second driving assembly 310 and the first link gear 322 of the first driving assembly 320 are engaged to be in contact with each other and the rotational driving force is transmitted to the first link gear 322 from the second link gear 314.

The arm assembly 340 may be located to be provided in the first arm body 343 and the second arm body 346 such that the second link gear 314 of the second driving assembly 310 and the first link gear 322 of the first driving assembly 320 are engaged. Here, in the arm assembly 340, the first link body 342 and the second link body 344 may be coupled in a state in which the second link gear 314 is coupled to the rotary shaft 318 and the second link shaft 317 is located in the rotary shaft 318 and in a state in which the first link gear 322 is coupled to the first link shaft 328.

Here, the first housing 326 is coupled and fixed to the outer circumferential surface of the first arm guide 341 and the second arm guide 345 coupled when the first link body 342 and the second link body 344 of the arm assembly 340 are coupled.

Figure 10:
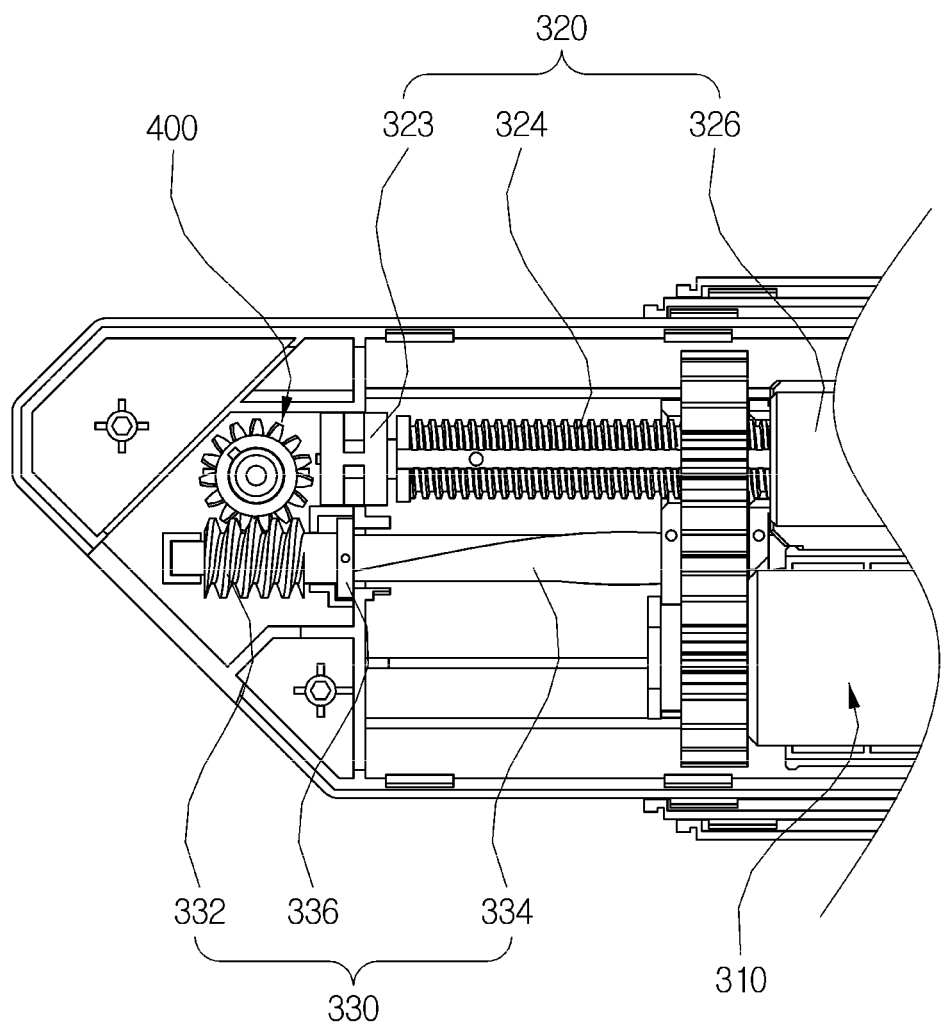
FIG. 10 is a view illustrating an arm unit and a tilting unit of a display mounting device for posture correction according to an exemplary embodiment of the present invention.

FIG. 10 is a view illustrating an arm unit and a tilting unit of a display mounting device for posture correction according to an exemplary embodiment of the present invention.

Referring to FIG. 10, the lead screw 330 of the arm unit 300 and the tilting unit 400 are coupled.

The tilting unit 400 forms a wheel shaped gear and forms a cylindrical tilting shaft to be connected to the display mount 100 to be driven.

The tilting shaft may form a protrusion to be coupled and fixed to the display mount 100 and may be fixed by being coupled to the groove formed in the display mount 100. The protrusion of the tilting shaft and the groove of the display mount 100 are coupled to restrict the movement of the display mount 100 and the tilting shaft moves in accordance with the movement of the wheel shaped gear of the tilting unit 400 to move the display mount 100.

Here, the arm unit 300 and the tilting unit 400 may be implemented by a worm and a worm gear. The worm of the arm unit 300 forms the screw thread and the worm wheel of the tilting unit 400 is engaged with the worm, but it is not limited thereto.

Figure 11:
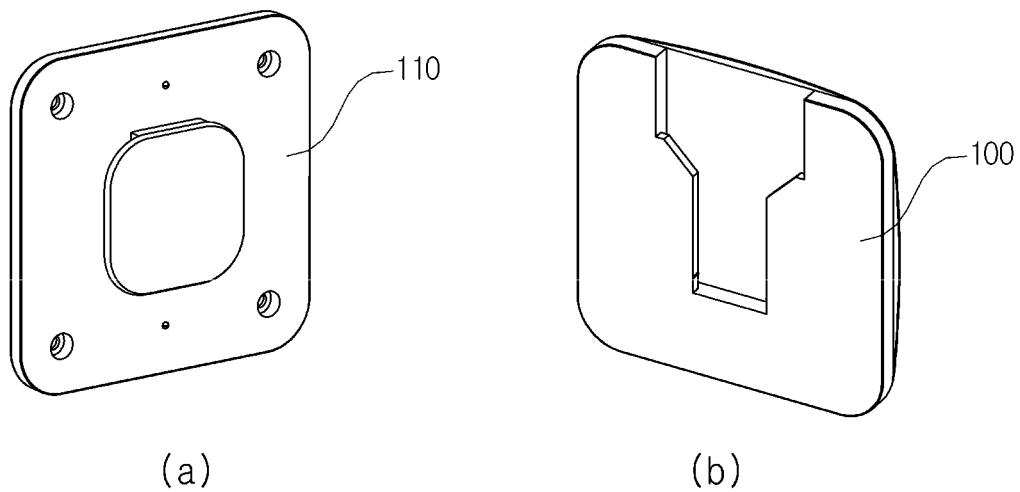
FIG. 11 includes diagrams showing a display mount and a mounting jig of a display mounting device for posture correction according to an exemplary embodiment of the present invention.
Figure 11:
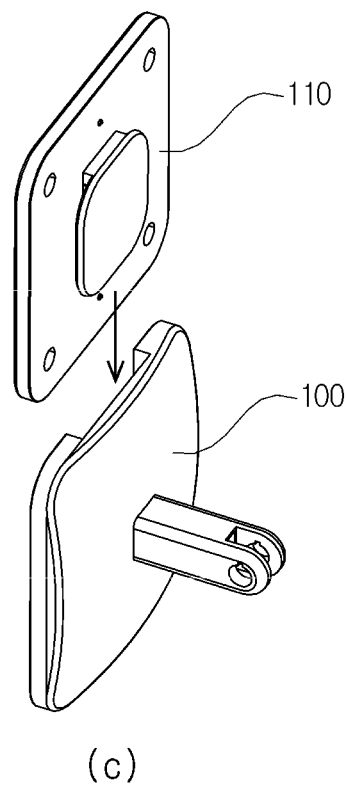

FIG. 11 includes diagrams showing a display mount and a mounting jig of a display mounting device for posture correction according to an exemplary embodiment of the present invention.

(a) of FIG. 11 is a view illustrating a mounting jig, (b) of FIG. 11 is a view illustrating a display mount, and (c) of FIG. 11 is a view illustrating the coupling of the mounting jig and the display mount.

The display mount 100 may fix the display 20 to mount the display 20.

The mounting jig 110 may be fastened to the display 20 and the display mount 100 to connect the display 20 and the display mount 100.

The display mount 100 of the present invention is a configuration which provides and fixes the display 20 including a monitor, a TV, and a mobile device to be used by the user. Even though a stand which fixes the display 20 to a predetermined position is attached to the display 20, a fixing unit is generally provided on a rear surface of the display 20 to fix the display 20 to the mounting device. The display mount 100 installs and fixes the display 20 by means of the fixing unit provided on the rear surface of the display 20. The fixing unit is generally provided in the standard called VESA and the display mount 100 is desirably manufactured in accordance with the VESA standard. According to the VESA standard, generally, a bolt groove having a predetermined shape is provided to closely attach and fix the rear fixing unit with the bolt. During the fixing with the bold, the display 20 needs to be held, so that the fastening process is not easy.

Accordingly, the display mount 100 of the present invention may use the mounting jig 110 to be coupled to the rear surface of the display 20 and the display mount 100 to install the display 20 by one touch. For example, after installing one side of the mounting jig 110 in the display 20 and installing the other side in the display mount 100, the mounting and fixing can be made just by lifting the display 20 to be fitted into the display mount 100. Of course, any method is irrelevant as long as it is a one-touch coupling method, but is not limited to the above-described method.

According to the exemplary embodiment of the present invention, a portion of the mounting jig 110 which is coupled to the display mount 100 protrudes to form grooves on both sides and the mounting jig may be slidably coupled to the display mount 100 along the grooves formed on both sides of the protruding portion, but is not necessarily limited thereto.

Figure 12:
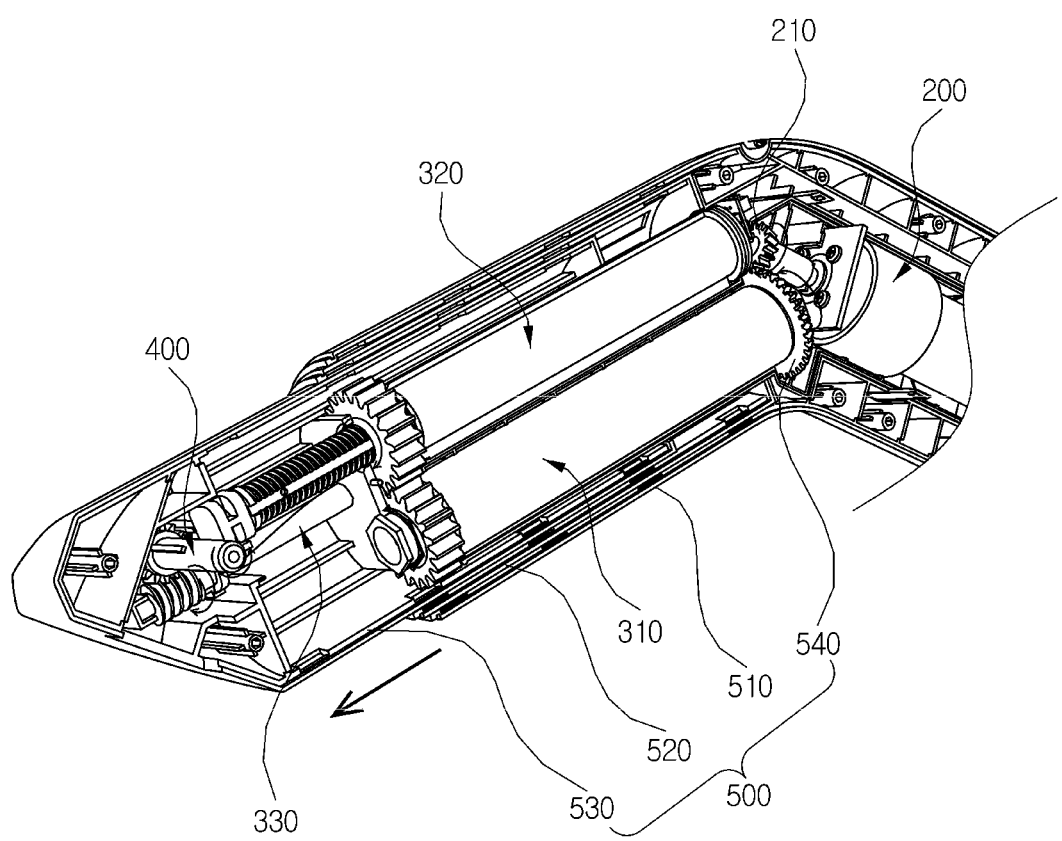
FIGS. 12 and 13 are views specifically illustrating stretching and extension of a display mounting device for posture correction according to an exemplary embodiment of the present invention.
Figure 13:
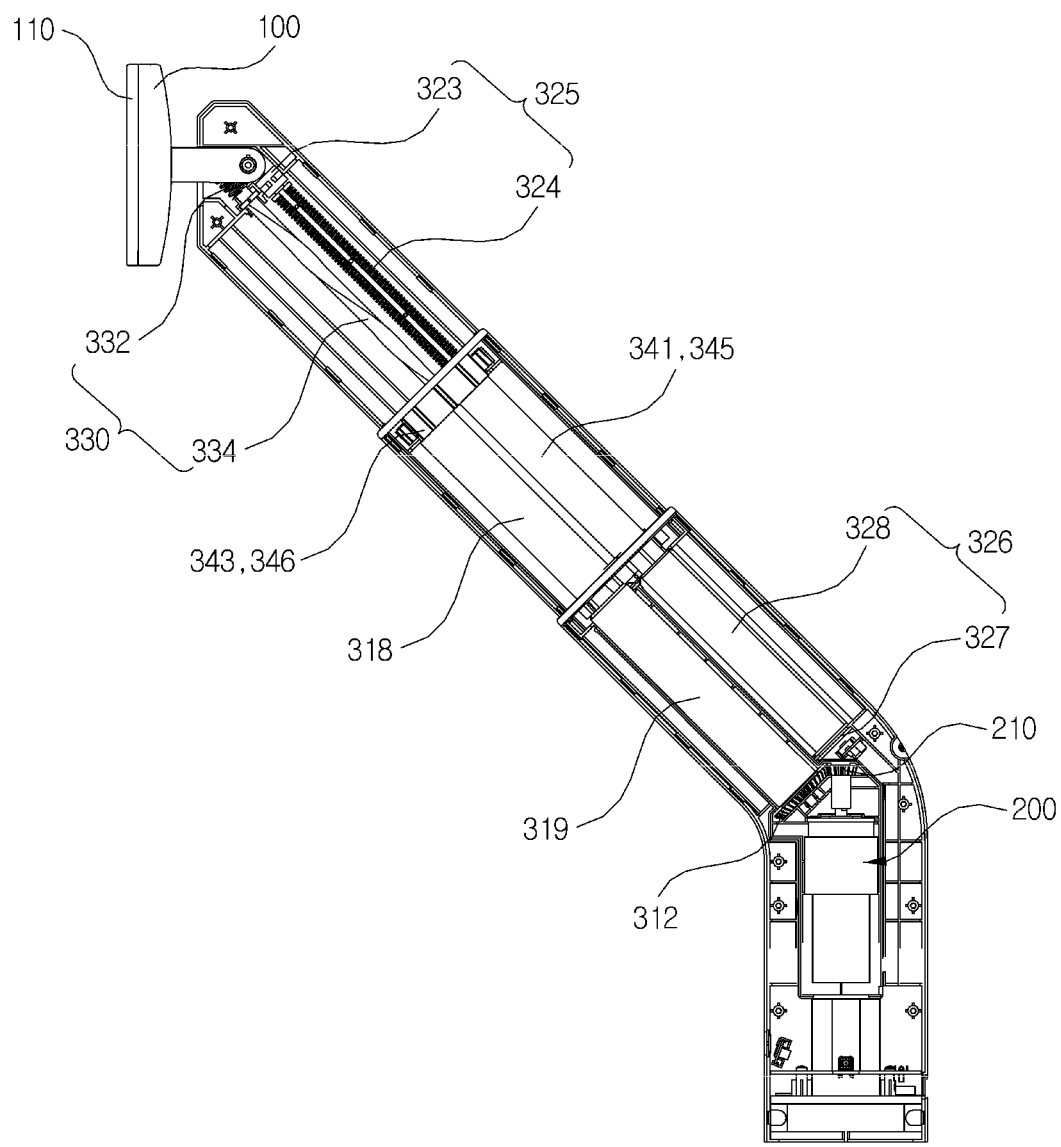

FIGS. 12 and 13 are views specifically illustrating stretching and extension of a display mounting device for posture correction according to an exemplary embodiment of the present invention.

FIG. 12 is a view illustrating rotation of gear to stretch and extend a display mounting device for posture correction according to the exemplary embodiment of the present invention and FIG. 13 is a view illustrating an extended arm unit of a display mounting device for posture correction according to an exemplary embodiment of the present invention.

In the display mounting device 10 for posture correction, when the gear 200 operates, the arm unit 300 may be stretched or extended as the driving gear 210 formed in the gear 200 rotates. For example, in the display driving device 10 for posture correction, when the driving gear 210 rotates to the left, the rotary gear 312 engaged with the driving gear 210 may rotate to the right. When the rotary gear 312 rotates to the right, the second link gear 314 rotates to the right while the rotary shaft 318 rotates to the right by the second housing 319 connected to the rotary gear 312. When the second link gear 314 rotates to the right, the first link gear 322 engaged with the second link gear 314 rotates to the left. The arm unit 300 may be extended by the above-described process and thus the lead screw 330 may rotate. At this time, the lead screw 330 rotates to the left and the tilting unit 400 connected perpendicularly to the lead screw 330 rotate to the right so that an angle of the display mount 100 may be reduced. Here, when the angle of the display mount 100 is reduced, it means that the display mount 100 moves to be directed to the lower end.

The arm unit 300 of the display mounting device 10 for posture correction is extended and the angle of the display mount 100 is adjusted by the above-described process. The extended arm unit 300 may return to its original state and the angle of the display mount 100 may also return to its original state as the driving gear 210 rotates in an opposite direction.

The above-described process is an example for explaining the present invention so that it is not necessarily limited to those described above and may be implemented to the contrary or a position of each gear is changed to stretch the arm unit 300 or change the angle of the display mount 100.

The arm unit 300 is a configuration which moves the display 20 to correct the posture of the user or adjust the position of the display 20 to be customized according to the usage environment of the display 20. The position of the display 20 is divided into a vertical position on the desk and a horizontal position to the user and the vertical and horizontal positions can be adjusted in the terms of the distance between the user and the display 20. However, in terms of the posture correction of the user, the head of the user needs to be moved so that the tinting angle of the display 20 needs to be adjusted in addition to the movement in terms of the distance.

It is desirable to obliquely move the display 20 toward the face of the user rather than a movement trajectory of the display 20 which moves vertically or horizontally, separately or sequentially. In other words, in order to move the head of the user to improve the text neck disease, when an upper end of the display 20 is inclined toward the user while increasing a vertical distance of the display 20 from the desk and reducing a horizontal distance with the user, the head is tilted back so that the posture of the user may be correctly corrected.

Accordingly, the display mounting device 10 may adjust the tilting angle of the display 20 using the tilting unit 400 at one time while stretching or contracting the length using the arm unit 300 by combining the arm unit 300 and the tilting unit 400. When a driving for each of the components is provided, a degree of freedom of the movement trajectory of the display 20 can be increased, but it may be disadvantageous because the control is complex and the manufacturing cost is increased.

According to the exemplary embodiment of the present invention, the display mounting device 10 may be configured not only to move the display 20 toward the user, but also tilt the display to the left and right using the arm unit 300 and the tilting unit 400.

Referring to FIG. 13, the driving motor 200 is fixed to the fourth column parts 540a and 540b provided in the first column parts 510a and 510b and the second driving assembly 310 of the arm unit 300 may be fixed thereto.

In the first column parts 510a and 510b, the first housing 326 of the first driving assembly 320 and the second housing 319 of the second driving assembly 310 may be located.

In the second column parts 520a and 520b, the arm assembling unit 340 is located and the first arm guide 341 and the second arm guide 345 which enclose the first link gear 322 and the first link shaft 325 fixed to the arm assembling unit 340 may be located.

In the third column parts 530*a* and 530*b*, the first link shaft 325 of the first driving assembly 320 and the lead screw 330 may be located.

Figure 14:
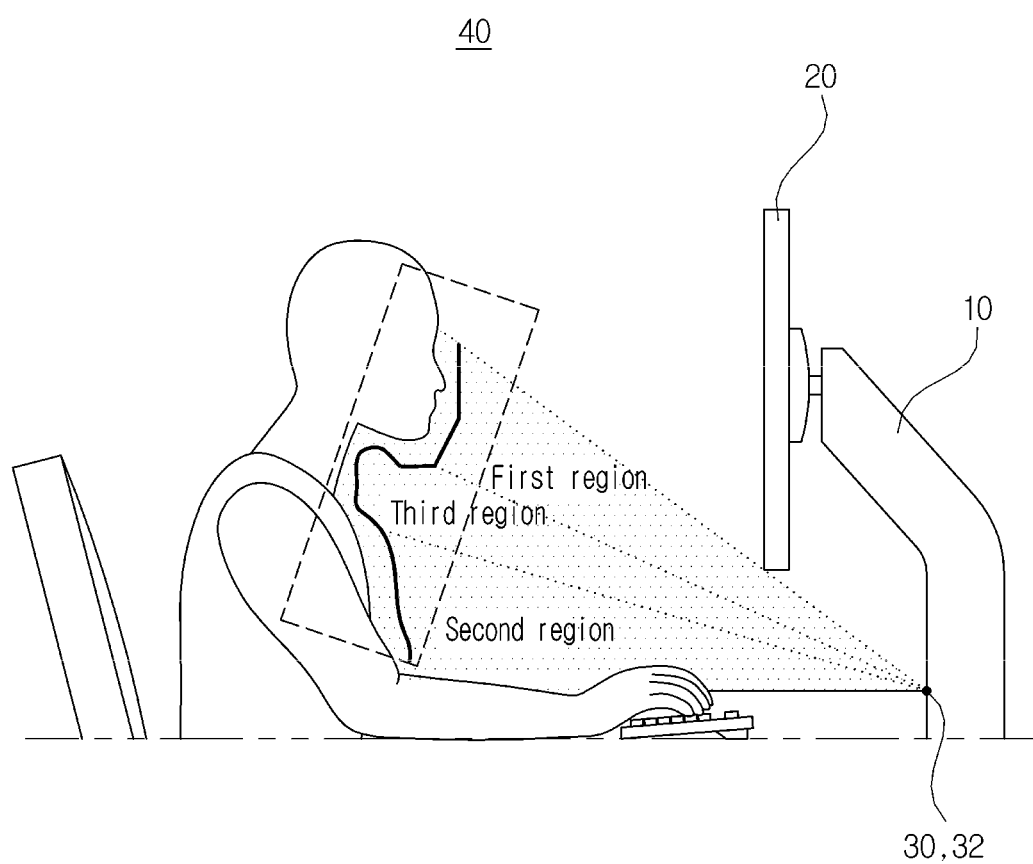
FIGS. 14 and 15 are views illustrating a display mounting control system using a display mounting device for posture correction according to an exemplary embodiment of the present invention.
Figure 15:
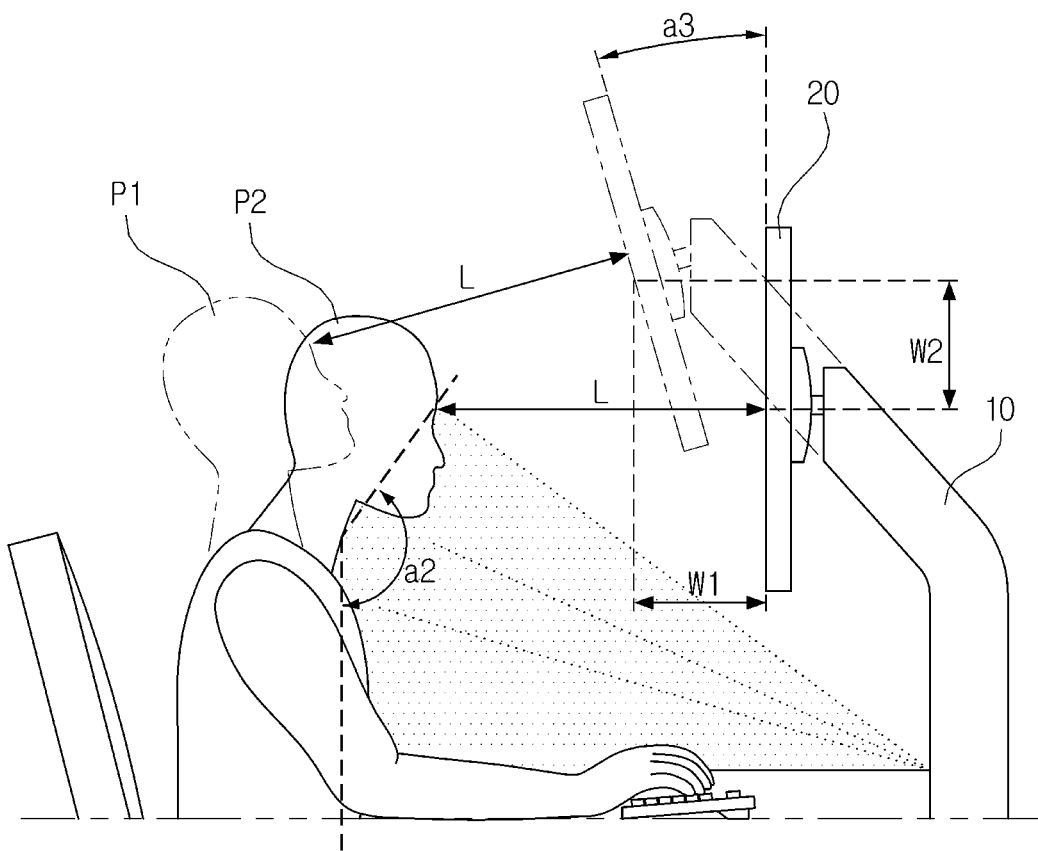

FIGS. 14 and 15 are views illustrating a display mounting control system using a display mounting device for posture correction according to an exemplary embodiment of the present invention.

FIG. 14 is a view illustrating a display mounting control system using a display mounting device for posture correction according to an exemplary embodiment of the present invention and FIG. 15 is a view illustrating an extended arm unit and a tilted display mount of a display mounting device for posture correction according to an exemplary embodiment of the present invention.

The display mounting control system 40 includes a display mounting device 10, a position detecting unit 30, and a control unit 32. The display mounting control system 40 may omit some components among various components which are exemplarily illustrated in FIGS. 14 and 15 or may additionally include other component.

In the display mounting control system 40, the display mounting device 10 is equipped in the display mount 100 to which the display 20 to be used by the user is equipped and fixed and the position of the user is detected by the position detecting unit 30 with respect to the equipped display 20. In the display mounting control system 40, the posture of the user, such as a bending angle of the neck of the user, may be determined on the basis of the detected position and the display 20 is moved in a direction in which a horizontal distance and a vertical distance of the display 20 are simultaneously adjusted by the display mounting device 10 to correct the posture of the user determined by the control unit 32, and the tilting angle of the display 20 is adjusted within a predetermined range in association therewith.

The position of the user indicates a position according to a distance between the user and the position detecting unit 30 with respect to the display 20 and may be provided separately for the head, the neck, and the body.

The position detecting unit 30 may detect the position of the user with respect to the display 20 mounted on the display mount 100 to determine the posture of the user.

The display mounting device 10 adjusts the position of the display 20 in accordance with the environment in which the user uses the display 20 and moves the display 20 to correct the posture of the user.

The control unit 32 controls an overall operation of the display mounting device 10 to determine the posture of the user on the basis of the user position detected by the position detecting unit and control the display mounting device 10 to adjust the movement of the display 20, thereby correcting the posture of the user.

According to the exemplary embodiment of the present invention, the display mounting control system 40 determines a first region corresponding to a face of the user, a second region corresponding to a chest, and a third region corresponding to the neck from a plurality of distance information of the image acquired by an LED proximity sensor and an IR distance sensor of the position detecting unit 30 and the control unit 32 diagnoses the posture of the user to drive the driving motor or issue an alarm to the user in consideration of distribution of feature values belonging to each region.

The display mounting control system 40 may distinguish the first region, the second region, and the third region by the image processing, for the above-described purpose. For example, it is confirmed that the posture is changed to a posture that the head is leaned forward for 10 minutes by checking that a first region distance value of 50 cm, a second region distance value of 53 cm, and a third region distance value of 52 cm at the time of 13:00 are changed to the first region distance value of 48 cm, the second region distance value of 52 cm, and the third region distance value of 51 cm at the time of 13:10.

The display mounting control system 40 recognizes the posture of the user and determines the posture to adaptively control the user. Specifically, the display mounting control system 40 utilizes a single posture recognizing sensor or a plurality of posture recognizing sensors in the position detecting unit 30 to measure the posture in front of the user. Here, the posture recognizing sensor may be implemented by a distance sensor and also implemented by a sensor using the infrared ray or laser. For example, the posture recognizing sensor may be implemented by a 3D time of flight (TOF) sensor, but is not necessarily limited thereto.

According to the exemplary embodiment of the present invention, when the position detecting unit 30 uses a single sensor, the display mounting control system 40 may measure a distance from the posture recognizing sensor to the user's head to measure the posture of the user. When the position detecting unit 30 uses a plurality of sensors, the posture of the user may be measured by measuring a distance from the posture recognizing sensor to the torso of the user.

Referring to FIGS. 14 and 15, even though it is illustrated that the position detecting unit 30 of the display mounting control system 40 uses a plurality of posture recognizing sensors, it is not necessarily limited thereto.

The display mounting control system 40 records the posture determined by the position detecting unit 30 in the chronological order through the control unit 32. At this time, the determined posture allows to determine that the seat is empty, the head is gradually tilted forward, and the user feels uncomfortable due to the posture guiding, but is not necessarily limited thereto.

Further, the control unit 32 may optimize the movement distance and the speed of the display 20 for the user, in accordance with the determination. For example, from a long-term point of view, the movement distance and the speed of the display 20 may be optimized for the user. The long-term view may be set to 12 weeks or longer because a general musculoskeletal rehabilitation training takes 12 weeks, but is not necessarily limited thereto.

The position detecting unit 30 may detect the position of the user who uses the display with respect to the display.

Referring to FIGS. 14 and 15, the position detecting unit 30 may be located at a lower end of the display mounting device for posture correction, but is not necessarily limited thereto and may be located in a position that the distance from the user can be measured.

The position detecting unit 30 may utilize at least one posture recognizing sensor to measure the posture in front of the user by dividing the posture into at least one region. Here, the posture recognizing sensor may measure a distance to a face position of the user.

The position detecting unit 30 may divide the region into a first region indicating a position of a user's face, a second region indicating a position of the user's torso, and a third region indicating a position of the user's neck to determine the distance from the user through at least one posture recognizing sensor. The position detecting unit 30 generates distance information from the user from the first region, the second region, and the third region to transmit the distance information to the control unit 32.

The control unit 32 determines the posture of the user on the basis of the position of the user detected by the position detecting unit 30 and controls the display mounting device 10 to correct the posture of the user.

The control unit 32 records the position of the user detected by the position detecting unit 30 at every time to determine the state of the user and distinguishes at least one region to diagnose the posture of the user in consideration of the distribution of the feature values belonging to each region according to the state of the user at every time to calculate an adjustment value to adjust the display mounting device 10.

According to the exemplary embodiment of the present invention, the adjustment value may include a speed at which the driving motor 200 is driven, a left or right driving direction to drive the driving gear 210, and a time when the driving motor 20 is driven, but is not necessarily limited thereto.

The control unit 32 may drive the driving motor 200 using the adjustment value calculated by a predetermined reference according to the posture of the user to control the position of the display.

The control unit 32 adjusts the movement distance and the speed of the display by the adjustment value and stores the movement distance and the speed of the display 20 according to the adjustment value to predict and provide a posture habit change of the user and a disease according to the posture habit. Here, the movement distance and the speed of the display may be determined by adjusting the movement distance and the moving speed of the arm unit 300 of the display mounting device 10.

The control unit 32 may vary the speed according to the movement distance. For example, the control unit 32 adjusts the display mounting device 10 at a high speed in a predetermined zone and at a slow speed in the other zone and also adjust the display mounting device for every user or every posture at a variable speed.

The display mounting control system 40 collects the user's position detected by the position detecting unit 30 in real-time and includes a notification unit (not illustrated for notifying the user when the distance between the user and the display 20 is deviated from a predetermined range.

The position detecting unit 30 may detect the position of the user with respect to the display 20. The position of the user is used to determine the posture of the user by the control unit 32 so that it is desirable to detect various positions in a plurality of points or portions of the user, rather than simply detecting only one point of the user, with respect to the display 20. In order to detect the position of the user, various sensors may be utilized, such as a sensor using infrared ray or laser or a time of flight (TOF) sensor. It is necessary to detect the position from a plurality of portions of the user, so that a sensor which detects various positions at one time such as a TOF sensor is desirable rather than a sensor which detects a single position. Specifically, it is important to identify whether the posture of the user is a text neck so that it is important to essentially identify the positions of the face, the neck, and the torso of the user.

Even though an example that the position detecting unit 30 which detects the position of the user is installed on a front lower end of the display mounting device 10 has been illustrated, the detecting unit may be provided as an attached type to be provided on a lower end or an upper end of the display 20. However, regardless of the installation position, in order to accurately measure the position of the user, a basic setting and a correcting process may be desirably performed.

According to the exemplary embodiment of the present invention, a plurality of position detecting units 30 is provided to measure the distances to the user's head, neck, and torso for every region or at least one position detecting unit is provided to move up and down and left and right to measure the distance from the head to the torso of the user, but is not necessarily limited to those described above.

The display mounting device 10 desirably moves within a predetermined range because the display 20 has its own weight and the movement beyond the predetermined range has no meaning. It is not possible to set the horizontal distance, the vertical distance, and the tilting angle that the display mounting device 10 moves the display 20 to infinite, so that it is desirable to restrict the movement within a predetermined range. In the case of the horizontal distance, since the display mounting device 10 is generally installed on the end of the desk, it is reasonable to determine the horizontal distance with respect to the vertical length of the desk and the size and the viewing angle of the display.

According to the exemplary embodiment of the present invention, in consideration of the color and the letter recognition, the viewing angle may be set to 35 degrees to the left and right. In consideration of the weight of the display, the posture of the user, and the limitation of adjusting the tilting angle, the maximum tilting angle may be set to 30 degrees. Even though the vertical distance is related to the user's seating height, the height of the display mounting device of the present invention can be relatively freely adjusted so that the range of the vertical distance may be derived by the limit of the tilting angle. The range of the horizontal distance can be set to 0 to (D–S/2 tan 35) by comprehensively considering the above-description. Of course, the viewing angle can be adjusted in consideration of the characteristic of the user's eyesight. A limit of the tilting angle is 30 degrees so that the vertical distance may be set to 0 to (S*sin 30)/(2 tan 35). That is, the range (W1) of the horizontal movement distance is adjusted to 0~(D–S/2 tan 35), the range (W2) of the vertical movement distance is adjusted to 0 (S*sin 30)/(2 tan 35), and the tilting angle (t3) is adjusted to 0 degree to 30 degrees.

The display mounting device 10 is configured not only to move the display toward the user, but also to tilt the display to the left and right, but it is desirable to determine whether to add the display mounting device 10 in terms of the usefulness based on the manufacturing cost and the easiness of the control.

The control unit 32 is a configuration which controls the display mounting device 10 to correct the posture of the user. The control unit 32 determines the posture of the user using the position of the user detected by the user position detecting unit 30. For example, the control unit 32 detects a first region indicating a distance from a user's face, a second region indicating a distance from the user's neck, and a third region indicating a distance from the user's torso and extracts an angle a2 to determine the posture of the user, that is, whether the posture is a text beck, after connecting the positions.

The angle a2 is extracted from the position of the user so that the angle a2 is smaller than a normal angle a1 so that a process of calculating a correction value by several tests is essential to determine an accurate posture. Further, when a specific position is detected, a position of the face, the neck, and the torso which is a position of the user necessary to determine the posture of the user is estimated from the position to be used. The calibration through the test is essential.

The control unit 32 sets a movement trajectory and a movement cycle of the display 20 in advance to automatically control the display 20. For example, if the display 20 is controlled to move back and forth with a predetermined cycle to relax or strengthen the muscles around the neck, the user may unconsciously move the head back and forth or nod up and down during the working so that the muscles around the neck may be relaxed or strengthened without awareness. According to the present invention, even though a correcting mode for correcting the posture of the user and a training mode for relaxing or strengthening the muscles around the neck are exemplified, user customized modes may be designed by varying the movement trajectory and the cycle or a separate mode may be newly created.

The display mounting device 10 may further include a notification unit which is installed in a noticeable position by the user such as a front portion of the display mounting device 10 to provide several events or notification generated from the display mounting device 10 to the user.

According to the exemplary embodiment of the present invention, the notification unit may be provided as an LCD panel having an appropriate size to transmit the notification for a mode which is being driven or a posture of the user as an image or a text or also transmit a simple notification such as whether the power is on/off or whether the posture of the user is appropriate, as a color or a number of turned on LEDs, using a plurality of LEDs.

The display mounting device 10 may further include a wireless module which transmits various information of the display mounting device 10 to a terminal registered by the user, such as a smart phone or a tablet or transmits and controls contents controlled by the user, such as position adjustment of the display 20, setting of the movement trajectory, cycle setting, or setting of the training mode or the correcting mode to the display mounting device through the user's terminal, using an application of a predetermined UI.

According to the exemplary embodiment of the present invention, the display mounting control system 40 determines the posture of the user on the basis of the positions of the face, the neck, and the torso, and further determines the posture on the basis of the position that the face, the neck, and the torso are deviated from the display 20 to the left or right. Specifically, the position detecting unit 30 may measure distances of the face, the neck, and the torso which are deviated from the center of the display 20 to the left or right and determines a posture that is tilted sideways or a posture that the head is tilted according to the deviated distance. Therefore, the display mounting control system 40 may determine all the up, down, left, and right postures of the user and move the display 20 with respect to the postures. Further, the display mounting control system 40 assigns a weight to the distances from the face, the neck, and the torso and the distances of the face, the neck, and the torso which are deviated from the center of the display 20 acquired by the position detecting unit 30 to set a degree of moving the display mounting device 10. Here, the weight may be set on the basis of the correction portion according to the health condition of the user and a portion that the distance deviated from the optimal state is large and a portion considered to maintain a correct portion may be differently set according to a current condition of the user to be used to train the posture and the posture may be corrected for each portion of the user.

The control unit 32 may record the posture determined by the position detecting unit 30 in a chronological order. At this time, the determined posture allows to determine that the seat is empty, the head is gradually tilted forward, and the user feels uncomfortable due to the posture guiding, but is not necessarily limited thereto.

According to another exemplary embodiment of the present invention, the control unit or a processor of the present exemplary embodiment may calculate a posture index indicating whether the posture of the user is correct using relational factors such as the distance from each point (face, neck, and torso) of the user and a current position (height or angle) of the monitor. Further, the posture index may be calculated by further considering the previously input setting value, that is, a user profile, such as the age, the gender, and the height of the user. For example, a distance relational value which is optimized by various simulations performed for the relational factors is calculated as a reference value and the posture index may be calculated by an error from the actual measurement value.

Figure 16:
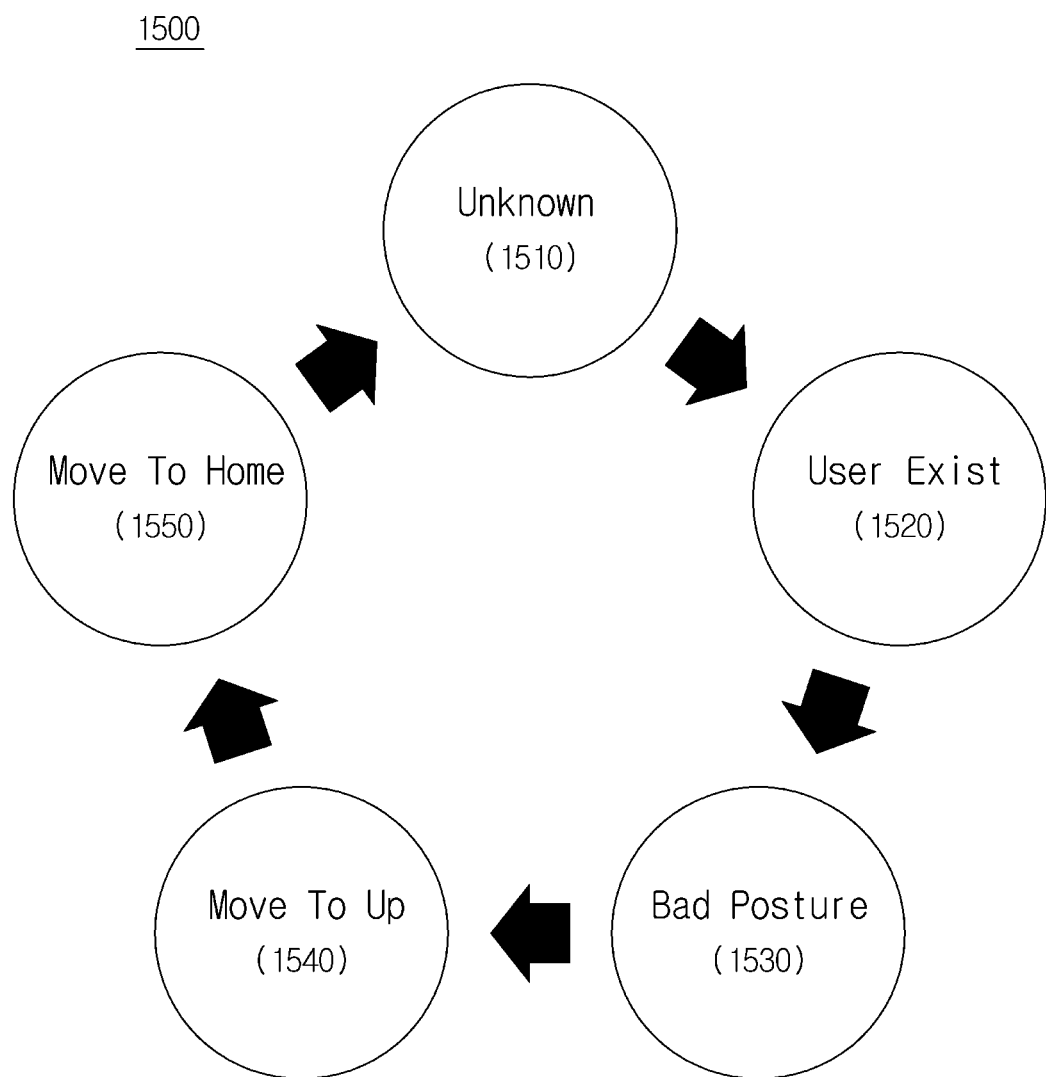
FIG. 16 is a view illustrating a state diagram of a display mounting control system of a display mounting device for posture correction according to an exemplary embodiment of the present invention.

FIG. 16 is a view illustrating a state diagram of a display mounting control system of a display mounting device for posture correction according to an exemplary embodiment of the present invention.

The state diagram 1500 includes an unknown stage 1510, a user exist stage 1520, a bad posture stage 1530, a move-to-up stage 1540, and move-to-home stage 1550.

The unknown stage 1510 is a state in which the position of the user is not known so that the position detecting unit 30 of the display mounting control system 40 may indicate a state in which the user is not located within a measurement distance.

The user exist stage 1520 is a state in which the user exists so that the position detecting unit 30 of the display mounting control system 40 may indicate a state in which the user is located within a measurement distance.

The bad posture stage 1530 indicates that a state in which the posture of the user is bad and the user may indicate a state that the user is located with a bad posture within the measurement distance by the position detecting unit 30 of the display mounting control system 40.

The move-to-up stage 1540 indicates that a state in which the posture of the user moves up and the user may indicate a state that the position of the face of the user moves up within the measurement distance by the position detecting unit 30 of the display mounting control system 40.

The move-to-home stage 1550 indicates the movement to a home position and indicates that the user is moved to maintain a correct posture by the display mounting control system 40.

However, the state of the state diagram 1500 is not necessarily limited to those described above.

According to the exemplary embodiment of the present invention, when the posture of the user is unstable in the unknown stage 1510, the state diagram 1500 may change the state to the user exist stage 1520.

When the user concentrates in the user exist stage 1520 to move the posture down, the state diagram 1500 changes the state to the bad posture stage 1530.

It is determined to adjust the display upwardly or downwardly in the bad posture stage 1530 so that the state diagram 1500 changes the state to the move-to-up stage 1540.

When the position of the display moves in the move-to-up stage 1540 so that the posture of the user is up, the state diagram 1500 is passed and even though the position of the display is moved, when the posture of the user is down and unstable, the state diagram 1500 is failed to change the state into the move-to-home stage 1550. Here, if it is failed, the bad posture stage 1530 is determined again to adjust the position of the display.

According to the exemplary embodiment of the present invention, the display mounting control system 40 designs a customized training by the state diagram 1500.

When the display 20 is lifted by the display mounting control device 10, the user may complain of discomfort at a specific height after the posture is induced for a while. This may be caused because a range of motion of the cervical spine is different for each user. Accordingly, the display mounting control system 40 may determine which posture change is shown by the user at a height of a distance which moves the display 30 and this may be confirmed by the move-to-up stage 1540 of the state diagram 1500.

The display mounting control system 40 checks a ratio of the previous pass and failure (fail) in the bad posture stage 1530 in which the display 20 needs to be lifted to determine to increase or decrease the distance that moves the display 20.

The display mounting control device 10 may additionally include a button that is pressed for a long time to reset the record for the customized training, on a side surface.

According to the exemplary embodiment of the present invention, the display mounting control system 40 acquires posture information during the display 20 used time and concentrated time data during the display 20 used time and transmits the acquired data to the outside in a wireless (Bluetooth) manner or a wired (USB or cable) manner.

Further, the display mounting control system 40 provides the feedback of the posture habit change to the user, predicts a musculoskeletal disease according to the posture habit to provide the predicted result to the user, provides the feedback of the immersion pattern to the user, and provides a concentration strengthening training according to the immersion pattern.

By doing this, the display mounting control system 40 may obtain the effects of reducing the industrial accident insurance premium of the company by predicting the musculoskeletal disease and enhancing the productivity of the company by the concentration strengthening training.

According to still another exemplary embodiment of the present invention, the position detecting unit 30 may calculate a first region distance, a second region distance, and a third region distance from the position detecting unit 30 on the basis of the acquired sensor value. When the position detecting unit is a TOF sensor, a distance value for every pixel may be calculated by calculating the TOF sensor value and the control unit 32 may determine a distance to a specific point (a center point) of each region as a representative distance for every region. The control unit 32 may determine the state in which the first region distance >the third region distance >the second region distance as a normal posture stage. When the time differential value with respect to at least one of the first, second, and third region distances, specifically, the first region distance is negative, the control unit 32 may be determined it as a "bad posture prestage". In the case of the bad posture prestage, the control unit 32 may transmit a warning message (a warning operation) to upwardly drive the monitor or upwardly drive the monitor a little bit and then downwardly drive the drive in its original position to the user.

Further, the third region distance is larger than the first region distance and the first region distance is smaller than the first reference value, it is a bad state in which the user bents the neck and the waist toward the monitor so that the control unit 32 determines the current posture as a "first bad posture stage". Here, the first reference value may be determined in the range of 40 to 60 cm, which may vary according to the usage environment. In this case, the control unit 32 may quickly drive the motor to upwardly move the display to switch the posture of the user to a desirable direction.

Further, even though the distance of the third region is larger than the first region distance, if the first region distance is larger than the first reference value, the control unit 32 may determine the current state as a "second bad posture stage". This is because the distance between the display and the user (head) is long, but the neck is bent. Further, the distance of the second region is farther than any one of the first region distance or the third region distance, the control unit 32 determines the current posture as a "bad posture prestage" and performs the above-described warning operation.

According to the exemplary embodiment of the present invention, the warning message notifies the user of the bad posture stage by an operation of repeating an operation of lifting or lowering the display 20 by the display mounting control device 10, an operation of turning on/off a warning light to provide a warning to the user, an operation of driving the driving motor 200 at a very high speed to move the display mounting control device 10 at a high speed, and an operation of providing a warning sound. However, it is not necessarily limited thereto and the warning message may be provided by an operation of informing the user of the bad posture state.

FIG. 17 includes diagrams showing a noise according to an operating time of a display mounting device for posture correction.

(a) of FIG. 17 is a view illustrating a noise according to an operating time of a display mounting device for posture correction according to the existing method. (b) of FIG. 17 is a view illustrating a noise according to an operating time of a display mounting device for posture correction according to the exemplary embodiment of the present invention.

In the display mounting device for posture correction, the arm unit 30 performs the linear motion by the operation of the driving motor 200 to be stretched or extended so that the noise may be generated as the driving motor 200 operates.

Referring to (a) of FIG. 17, in the display mounting device for posture correction of the related art, when the motor does not operate, the noise is not generated but when the operation of the motor is rapidly performed to adjust the length of the arm unit, a loud noise may be generated. At this case, the generated noise may distract the user who uses the display mounting device for posture correction.

Human hearing is sensitive to the changes so that the noise generated by the operation of the driving motor 200 of the display mounting device 10 for posture correction may distract the user who uses the display mounting device 10 for posture correction. The display mounting device 10 for posture correction of the present invention may be implemented as follows so as not to distract the user.

The display mounting device 10 for posture correction sets a maximum driving speed of the rotational driving force of the driving motor 200 according to the movement length that the arm unit 300 is stretched or extended and after gradually increasing the rotational driving force to the maximum driving speed along the movement length that the arm unit 300 is stretched or extended for a predetermined time, and then gradually decreases the rotational driving force.

Referring to (b) of FIG. 17, in the display mounting device 10 for posture correction, the noise is not generated while the driving motor 200 does not operate and the driving motor 200 is linearly driven to adjust the length of the arm unit 300 so as not to distract the user.

As an operation noise is proportional to a rotational speed of the driving motor, the display mounting device 10 for posture correction may minimize a distraction factor of the user by adjusting a rotational speed (RPM) according to the movement distance. Here, the rotational speed of the driving motor may be set by multiplying the stretched distance by a predetermined constant.

When the driving motor 200 operates, the speed of the display mounting device 10 for posture correction is linearly changed and as the speed rises to the maximum speed and then is lowered, an inflection point may be formed as illustrated in (b) of FIG. 17, but is not necessarily limited thereto. Here, the inflection point is a maximum driving speed of the driving motor 200.

Specifically, unlike the related art that when the length of the arm unit 300 is adjusted, a loud noise is generated during the high-speed operation, the display mounting device 10 for posture correction adjusts the rotational speed according to the movement distance of stretching the arm unit 300 and as the speed is gradually increased, the noise generated by the driving motor 20 is gradually increased and then the speed is gradually reduced with respect to the inflection point to minimize the distraction element of the user.

The display mounting device 10 for posture correction may set a maximum driving speed which causes a noise which does not distract the user and adjust the speed of the driving motor 200 according to the movement distance with respect thereto. Here, the display mounting device 10 for posture correction may further consider the movement time and sets a maximum movement time until the arm unit 300 moves to be fixed to maintain a target posture. Accordingly, the display mounting device 10 for posture correction linearly drives the driving motor 200 such that the movement distance of the arm unit 300 does not exceed the maximum driving speed within a predetermined movement time to maintain a target posture.

Specifically, when the arm unit 300 moves by a predetermined distance, the display mounting device 10 for posture correction operates the driving motor 200 to increase the speed by half the predetermined distance and when the speed reaches to the maximum driving speed, operates the driving motor to reduce the speed of the driving motor by half the predetermined distance to stop the operation.

Accordingly, the display mounting device 10 for posture correction increases the usage convenience by controlling the stretching speed to be gradually increased.

According to another exemplary embodiment of the present invention, the control unit 32 classifies the state of the user into a normal state or an abnormal state (for example, a bad posture stage) and varies an acceleration of the driving motor according to the state of the user.

For example, the posture of the user is normal and a button (not illustrated) manipulating signal of the user for adjusting a height of the display 20 is input, the control unit 32 sets to increase the speed of the driving motor according to a 1-1-th acceleration and decrease the speed the driving motor according to a 1-2-th acceleration. Here, the manipulating signal which is input by the user to adjust the height of the display 20 may be generated not only by a button, but also by adjusting a normal posture setting by the control unit 32.

When it is determined that the posture of the user is an abnormal state, that is, the posture of the user is in a bad posture stage, the control unit 32 moves the display 20 to maintain the normal state. At this time, the control unit 32 is set to increase the speed of the driving motor 200 at an acceleration which is lower than the 1-1-th acceleration and decrease the speed of the driving motor 200 at an acceleration which is lower than the 1-2-th acceleration. Further, in the example of FIG. 17, a gradient indicates an acceleration at which the display moves and a magnitude of the acceleration may vary according to the abnormal stage degree of the user. For example, when the user's abnormal state is mild (for example, it can be determined according to an error index), the acceleration in the increase section can be made relatively small and when the abnormal state is severe, the acceleration may be relatively increased by the increase section.

Even though it has been described above that all components of the exemplary embodiment of the present invention are combined as one component or operate to be combined, the present invention is not limited to the exemplary embodiment. In other words, one or more components may be selectively combined to be operated within a scope of the present invention.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protection scope of the present invention should be interpreted based on the following appended claims and it should be appreciated that all technical spirits included within a range equivalent thereto are included in the scope of the present invention.

What is claimed is:

1. A method of adjusting a monitor, the method comprising:
providing an information display system comprising a base placed on or connected to a desk, an arm connected to the base, the monitor fixed to the arm via a mount, at least one sensor, at least one controller, and a driving module comprising at least one motor and a driving mechanism operatively connected to the at least one motor;
detecting, using the at least one sensor, a plurality points on a person who is sitting at the desk in front of the monitor;
assessing, by the at least one controller, a posture of the person using the detected points on the person; and
subsequent to assessing the posture, controlling, by the at least one controller, the driving module to adjust a location and a tilting of the monitor in view of the assessed posture such that the more the monitor advances toward the person along a horizontal direction, the higher the monitor is raised and the more an information display surface of the monitor tilts downward relative to a horizontal surface of the desk, in which a level of the adjustment of the location of the monitor is determined based on a distance between the monitor and the person and a size of the information display surface, and further in which a level of the adjustment of the tilting is determined in view of the level of adjustment of the location of the monitor.

2. The method of claim 1, wherein the at least one controller controls the driving module to adjust the tilting of the monitor in view of the location of the monitor that is being adjusted.

3. The method of claim 1, further comprising placing the base on or connecting the base to a desk, wherein the at least one controller controls the driving module to adjust the location of the monitor in a vertical direction relative to a desk on which the information display system is placed.

4. The method of claim 1, wherein assessing the posture comprises assessing a bending angle of the person's neck.

5. The method of claim 1, wherein the at least one controller assesses the posture of the person based on at least one location of a face, a neck and a torso of the person.

6. The method of claim 5, wherein the at least one controller assesses the posture of the person based on a distance to the face, a distance to the neck and a distance to the torso relative to a reference point.

7. The method of claim 5, wherein the at least one controller assesses the posture of the person based on an angle between a first line connecting the face and the neck and a second line connecting the neck and the torso.

8. The method of claim 1, wherein the at least one controller control the driving module to adjust the location of the monitor in a vertical direction and in the horizontal direction simultaneously.

9. The method of claim 1, wherein the at least one controller controls the driving module such that the monitor moves in the horizontal direction and a vertical direction concurrently rather than consecutively.

10. The method of claim 1, wherein the arm comprises a first arm portion and a second arm portion, wherein the first arm portion is generally vertical and integral to the base, wherein the second arm portion extends from the first arm portion and is slanted relative to the first arm portion.

11. The method of claim 1, wherein the arm comprises a housing that houses the at least one motor and at least part of the driving mechanism.

12. The method of claim 1, wherein the arm comprises at least part of the driving mechanism.

13. The method of claim 1, wherein in a preset mode, the at least one controller controls the driving module for adjusting at least one of the location of the monitor along a predetermined trajectory.

14. The method of claim 1, wherein in a preset mode, the at least one controller controls the driving module for moving the monitor back and forth relative to the person.

15. The method of claim 1, wherein the driving mechanism comprises at least one gear operatively connected to the at least one motor.

16. The method of claim 1, wherein the driving mechanism comprises at least one column configured to convert rotation of the at least one motor to a linear displacement.

17. The method of claim 1, wherein the base comprises a clamp for clamping the desk.

18. The method of claim 1, wherein the at least one sensor is disposed at the arm at a level below the monitor.

19. The method of claim 1, wherein the at least one sensor is provided for placing on a surface of the arm.

20. The method of claim 1, wherein the at least one sensor comprises a time-of-flight sensor.

21. The method of claim 1, wherein assessing the posture comprises determining a face, a neck and a torso of the person using at least part of the detected points.

22. The method of claim 1, wherein the arm comprises a slanted section extending between a lower end and an upper end thereof in a slanted direction, in which the upper end is higher than the lower end in a vertical direction and the upper end is closer to the person than the lower end in a horizontal direction.

23. The method of claim 22, wherein the driving mechanism comprises a displacement mechanism configured to cause a liner motion of the upper end of the slanted section along the slanted direction:

such that the upper end of the slanted section is to move upward and downward along the vertical direction and further is to move toward and away from the person along the horizontal direction while the lower end of the slanted section does not move along either the vertical direction or the horizontal direction;

such that the slanted section changes a length thereof along the slanted direction;

such that the upper end of the slanted section moves toward the person along the horizontal direction as the upper end moves upward along the vertical direction;

such that the upper end of the slanted section moves away from the person along the horizontal direction as the upper end moves downward along the vertical direction; and further such that the location of the monitor is adjusted both along the horizontal direction and the vertical direction concurrently as opposed to adjusting of the location of the monitor along the horizontal direction independently from adjusting of the location of the monitor along the vertical direction, wherein the driving mechanism further comprises a tilting mechanism configured to adjust the tilting of the monitor.

* * * * *